(12) United States Patent
Torjesen et al.

(10) Patent No.: US 12,377,993 B2
(45) Date of Patent: Aug. 5, 2025

(54) ENGINE ATTACHMENT SYSTEM FOR AIRCRAFT AND METHOD FOR ATTACHING AN ENGINE

(71) Applicant: The Boeing Company, Arlington, VA (US)

(72) Inventors: Luke D. Torjesen, Everett, WA (US); Donald T. Powell, Everett, WA (US); Kory K. Shaffer, Hayward, CA (US); Druh Palma, Mill Creek, WA (US); Kyle Stevens, Mill Creek, WA (US)

(73) Assignee: The Boeing Company, Arlington, VA (US)

( * ) Notice: Subject to any disclaimer, the term of this patent is extended or adjusted under 35 U.S.C. 154(b) by 103 days.

(21) Appl. No.: 18/194,738

(22) Filed: Apr. 3, 2023

(65) Prior Publication Data

US 2023/0331391 A1  Oct. 19, 2023

Related U.S. Application Data

(60) Provisional application No. 63/331,334, filed on Apr. 15, 2022.

(51) Int. Cl.
*B64D 27/12* (2006.01)
*B64D 27/40* (2024.01)
*B64F 5/10* (2017.01)

(52) U.S. Cl.
CPC .............. *B64D 27/12* (2013.01); *B64D 27/40* (2024.01); *B64D 27/402* (2024.01); *B64F 5/10* (2017.01)

(58) Field of Classification Search
CPC ...... B64D 27/40; B64D 27/402; B64D 27/12; B64F 5/10; B64C 3/32
See application file for complete search history.

(56) References Cited

U.S. PATENT DOCUMENTS

| 5,275,357 | A | 1/1994 | Seelen |
| 5,620,154 | A | 4/1997 | Hey |
| 5,649,417 | A | 7/1997 | Hey |
| 5,860,623 | A | 1/1999 | Dunstan et al. |
| 6,189,830 | B1 | 2/2001 | Schnelz et al. |
| 7,451,947 | B2 | 11/2008 | Machado et al. |

(Continued)

OTHER PUBLICATIONS

European Patent Office, Extended European Search Report, App. No. 23167184.3 (Aug. 21, 2023).

(Continued)

*Primary Examiner* — Valentina Xavier
(74) *Attorney, Agent, or Firm* — Walters & Wasylyna LLC

(57) ABSTRACT

An engine attachment system includes a strut box. The strut box includes a longitudinal axis, a forward portion that extends along the longitudinal axis, and an aft portion that extends from the forward portion along the longitudinal axis. The engine attachment system includes a forward attachment apparatus that is coupled to the forward portion of the strut box and that is coupleable to a forward spar of the wing. The engine attachment system includes an aft attachment apparatus that is coupled to the aft portion of the strut box and that is coupleable to an aft spar of the wing. When the strut box is coupled to the wing by the forward attachment apparatus and the aft attachment apparatus, the aft portion of the strut box is positioned under the wing. The strut box is coupleable to an engine.

20 Claims, 12 Drawing Sheets

(56) References Cited

U.S. PATENT DOCUMENTS

| 8,342,444 B2 * | 1/2013 | Hartshorn ............ B64D 27/40 |
| | | 244/54 |
| 9,238,511 B2 | 1/2016 | Wooley et al. |
| 9,248,921 B2 | 2/2016 | West |
| 2019/0202572 A1 | 7/2019 | Pautis et al. |
| 2020/0148378 A1 | 5/2020 | Pautis et al. |
| 2021/0070459 A1 | 3/2021 | West |

OTHER PUBLICATIONS

European Patent Office, "Communication pursuant to Article 94(3) EPC," App. No. 23 167 184.3 (Nov. 19, 2024).

* cited by examiner

ENGINE ATTACHMENT SYSTEM FOR AIRCRAFT AND METHOD FOR ATTACHING AN ENGINE

PRIORITY

This application claims priority from U.S. Ser. No. 63/331,334 filed on Apr. 15, 2022.

FIELD

The present disclosure relates generally to aircraft engine attachment structures and, more particularly, to a system configured for attaching an aircraft engine to an aircraft wing.

BACKGROUND

Modern aircraft include a mounting structure to mount an engine to a wing of the aircraft. Typical mounting structures include various mechanical attachments, such as plurality of interconnected trusses and joints that create a space frame, for carrying the loads of the engine into the wing. Such engine mounting structures are designed to handle a variety of loads, during all phases of flight. The loads include vertical loads (e.g., the weight of the engine plus maneuver loads), axial loads (e.g., caused by the engine's thrust), side loads (e.g., caused by wind buffeting), and torsion loads (e.g., caused by the rotary operation of the engine or by the loss of a turbine blade). The design of the mounting structure considers resistance to engine loads, mass, structural integrity, and placement of the engine relative to the wing. However, to provide and maintain the necessary stiffness and load-carrying capacity of the interface between the engine and the wing, the engine mounting structure may be larger, heavier, or more complex than desired. Additionally, traditional engine mounting structures may be unsatisfactory as modern wings become more slender. Further, most engine mounting structures are designed to be fail-safe (e.g., to prevent the engine from separating from the wing). Typical fail-safe design includes doubling components of the mechanical attachments to provide an alternative load path upon failure of a component, which further increases the size, weight, and complexity of the mounting structure.

Accordingly, those skilled in the art continue with research and development efforts in the field of aircraft engine attachment structures.

SUMMARY

Disclosed are examples of an engine attachment system, an aircraft, a method for attaching an engine to a wing of an aircraft. The following is a non-exhaustive list of examples, which may or may not be claimed, of the subject matter according to the present disclosure.

In an example, the disclosed engine attachment system includes a strut box. The strut box includes a longitudinal axis, a forward portion that extends along the longitudinal axis, and an aft portion that extends from the forward portion along the longitudinal axis. The engine attachment system includes a forward attachment apparatus that is coupled to the forward portion of the strut box and that is coupleable to a forward spar of the wing. The engine attachment system includes an aft attachment apparatus that is coupled to the aft portion of the strut box and that is coupleable to an aft spar of the wing. When the strut box is coupled to the wing by the forward attachment apparatus and the aft attachment apparatus, the aft portion of the strut box is positioned under the wing. The strut box is coupleable to an engine.

In an example, the disclosed aircraft includes a fuselage and wings. Each wing is coupled to and extends from the fuselage. The wing includes a forward spar and an aft spar. The aircraft includes a strut box. The strut box includes a longitudinal axis, a forward portion that extends along the longitudinal axis, and an aft portion that extends from the forward portion along the longitudinal axis and that is positioned under the wing. The aircraft includes a forward attachment apparatus that is coupled to the forward portion of the strut box and that is coupled to the forward spar of the wing. The aircraft includes an aft attachment apparatus that is coupled to the aft portion of the strut box and that is coupled to the aft spar of the wing. The aircraft includes an engine 306 that is coupled to the strut box 102.

In an example, the disclose method includes steps of: (1) positioning a strut box relative to a wing such that an aft portion of the strut box is positioned under the wing; (2) coupling a forward portion of a strut box to a forward spar of a wing using a forward attachment apparatus; (3) coupling an aft portion of the strut box to an aft spar of the wing using an aft attachment apparatus; and (4) coupling an engine to the strut box.

Other examples of the disclosed engine attachment system, aircraft, and method will become apparent from the following detailed description, the accompanying drawings, and the appended claims.

DETAILED DESCRIPTION

Figure 1:
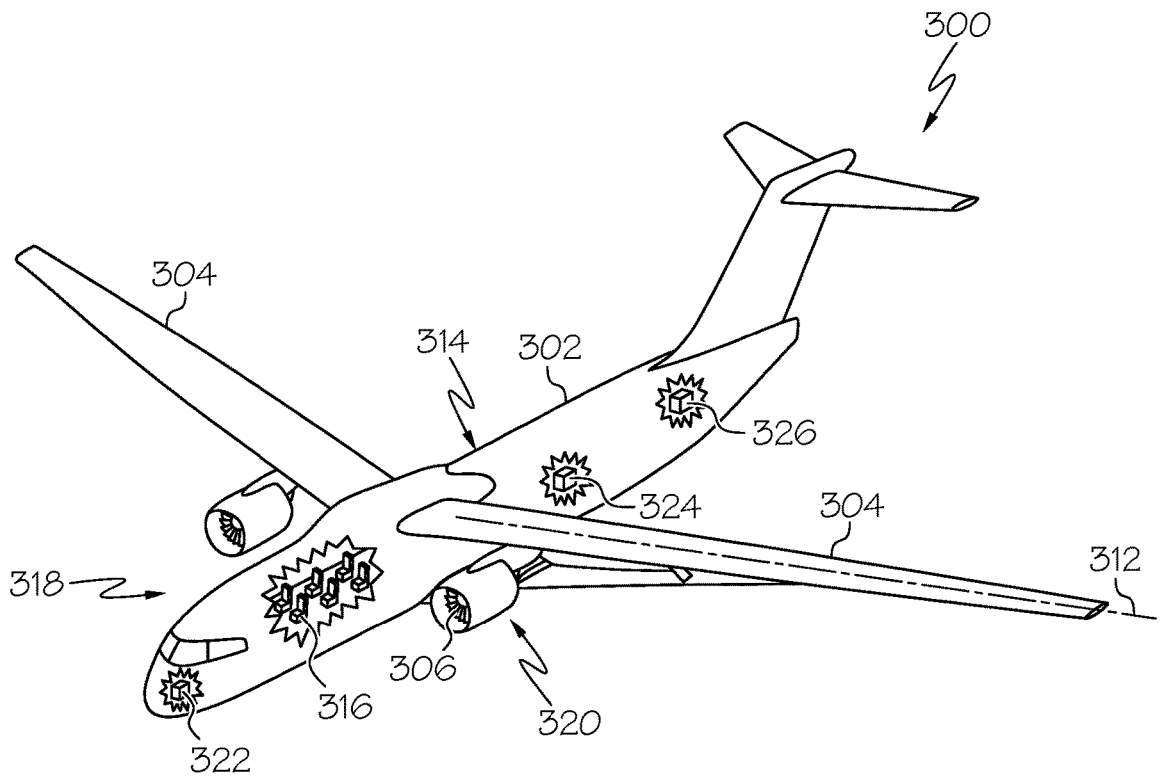
FIG. 1 is a schematic, perspective view of an example of an aircraft.

Referring generally to FIGS. 1-12, the present disclosure is directed to examples of an engine attachment system 100 for attaching or otherwise mounting an engine 306 of an aircraft 300 to a wing 304 of an aircraft 300. The present disclosure is also directed to examples of the aircraft 300 that includes or otherwise utilizes the engine attachment system 100 for attaching or otherwise mounting the engine 306 to the wing 304.

The disclosed engine attachment system 100 utilizes a strut box 102 that includes an aft portion 108 that is attached to the wing 304 of the aircraft 300 and that extends under an underside (e.g., lower surface) of the wing 304. The strut box 102 is capable of bending. The configuration and design of the engine attachment system 100 potentially reduces the weight of the strut box 102 and the wing 304. The configuration and design of the engine attachment system 100 also potentially reduces drag by installing the engine 306 in such manner that the fundamental dynamic modal frequencies that interact with a wing structure is higher, thereby avoiding flutter and reducing gust loads.

The disclosed engine attachment system 100 may also provide particular advantages with wings that have a relatively high aspect ratio (e.g., thin wings with small chord dimensions). However, the configuration and design of the engine attachment system 100 may be utilized with any type of wing configuration.

The present disclosure recognizes that when a wing and an engine (e.g., or other propulsion system) produce a detrimental dynamic response, structural loads drive weight and impact drag. There are limited means to adjust vertical and lateral propulsion system frequencies, all of which adversely impact system weight and drag. This can lead to high gust loads that add system weight or mitigation measures that add drag. The disclosed engine attachment system 100 addressed this problem by providing a means to adjust natural modal frequencies, thereby reducing dynamic gust loads and improving aero-elastic stability by having a unique tunable configuration with a reduced number of attachment interfaces.

Figure 2:
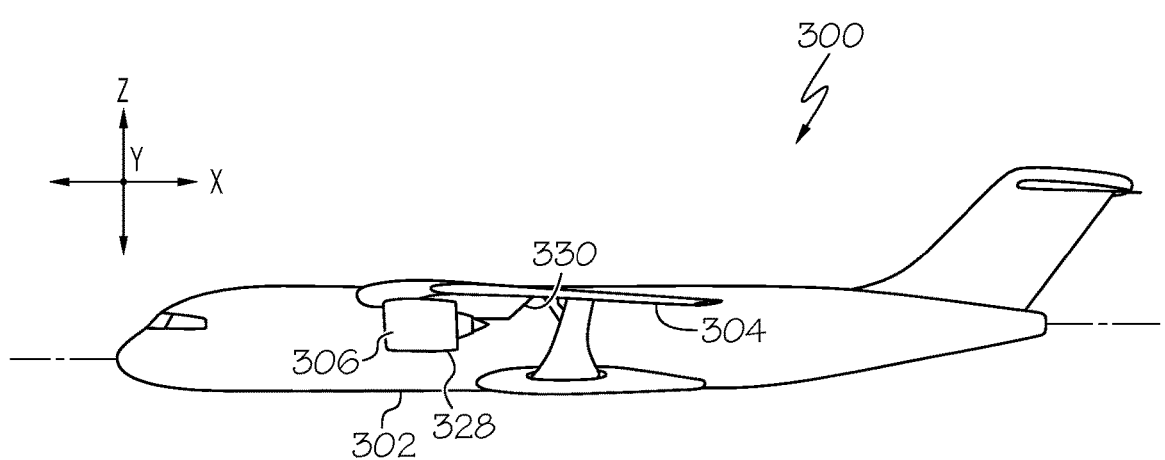
FIG. 2 is a schematic, side elevation view of the example of the aircraft shown in FIG. 1.

FIGS. 1 and 2 schematically illustrate an example of the aircraft 300. Generally, examples of the disclosed engine attachment system 100 are described with respect to a fixed wing aircraft, such as the aircraft 300. However, it should be understood that the examples of the disclosed engine attachment system 100 may be implemented with any suitable aerospace vehicle, such as unmanned aerial vehicles (UAVs), spacecraft, and the like.

In one or more examples, the aircraft 300 includes an airframe 314 having the interior 316. The aircraft 300 also includes a plurality of onboard systems 318 or other high-level systems. Examples of the onboard systems 318 include one or more of a propulsion system 320, an electrical system 322, a hydraulic system 324, and an environmental system 326. In other examples, the aircraft 300 may include any number of other types of systems, such as a flight control system, an avionics system, a communication system, a guidance system, a weapons system, landing gear (e.g., main and nose landing gear) systems, and the like. In one or more examples, the onboard systems 318 may also include one or more control systems coupled to the airframe 314, such as flaps, spoilers, ailerons, slats, rudders, elevators, and trim tabs. One or more of these onboard systems 318 may have an associated system control unit.

In one or more examples, the aircraft 300 includes a fuselage 302 and wings 304. Each one of the wings 304, herein referred to individually as the wing 304, is coupled to and extends from the fuselage 302. In one or more examples, the wing 304 includes a wing box structure and includes a spanwise axis 312. The spanwise axis 312 extends from a root of the wing 304 to a tip of the wing 304. Reference to the spanwise axis 312 may refer to a longitudinal midline or central axis of the wing 304. The wing 304 includes spanwise structural members (e.g., spars) that run along the spanwise axis 312, chordwise structural members (e.g., ribs) that run transverse to the spanwise axis 312, and skin panels that are coupled to the spanwise structural members and/or the chordwise structural members.

The engine 306 is an example of a portion of the propulsion system 320. The engine 306 is attached to the wing 304 using the disclosed engine attachment system 100. In one or more examples, the engine 306 is a turbofan engine. As illustrated in FIG. 2, the aircraft 300 may include a cowling 328 (e.g., an engine cowling) that surrounds the engine 306 and a fairing 330 (e.g., a pylon fairing) that surrounds the engine attachment system 100.

In one or more examples, the wing 304 has a high aspect ratio. For example, the wing 304 is a high aspect ratio wing having a relatively long span and a relatively short chord. A high aspect ratio wing may have a reduced spacing between the forward spar 308 (e.g., a forwardmost spar) and the aft spar 310 (e.g., an aftmost spar), such as approximately one-half the chord distance compared to a conventional wing. A high aspect ratio wing may also have a reduced spar height dimension, such as approximately one-half the height dimension of a conventional wing spar. It can be appreciated that the aerodynamic performance of the aircraft 300 can be improved by increasing the aspect ratio of the wings 304.

In one or more examples, wing 304 is a swept wing. For example, the wing 304 may be swept at an angle of between approximately 10 degrees to approximately 25 degrees.

Figure 3:
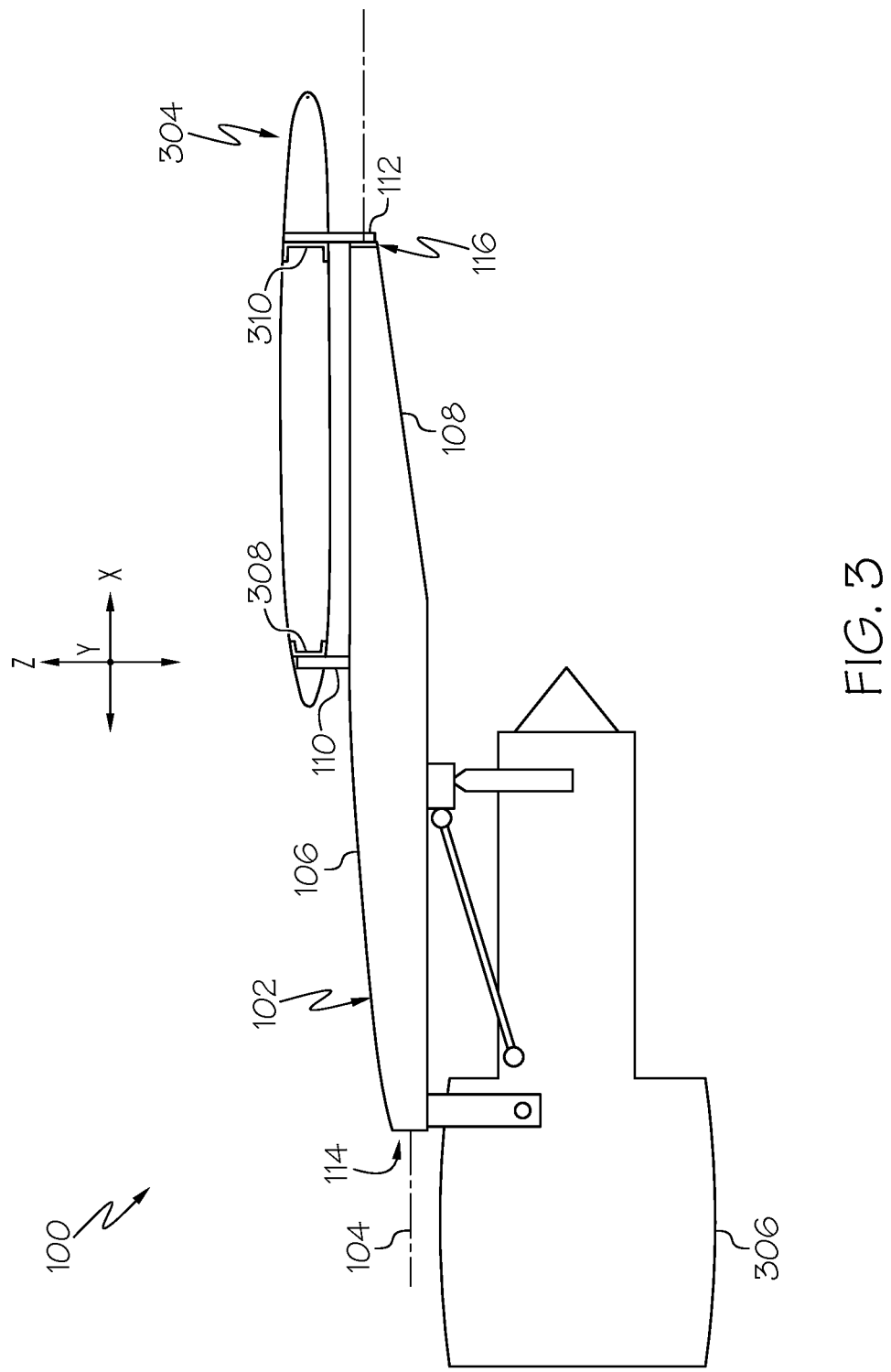
FIG. 3 is a schematic, side elevation view of an example of an engine attachment system for the aircraft.
Figure 4:
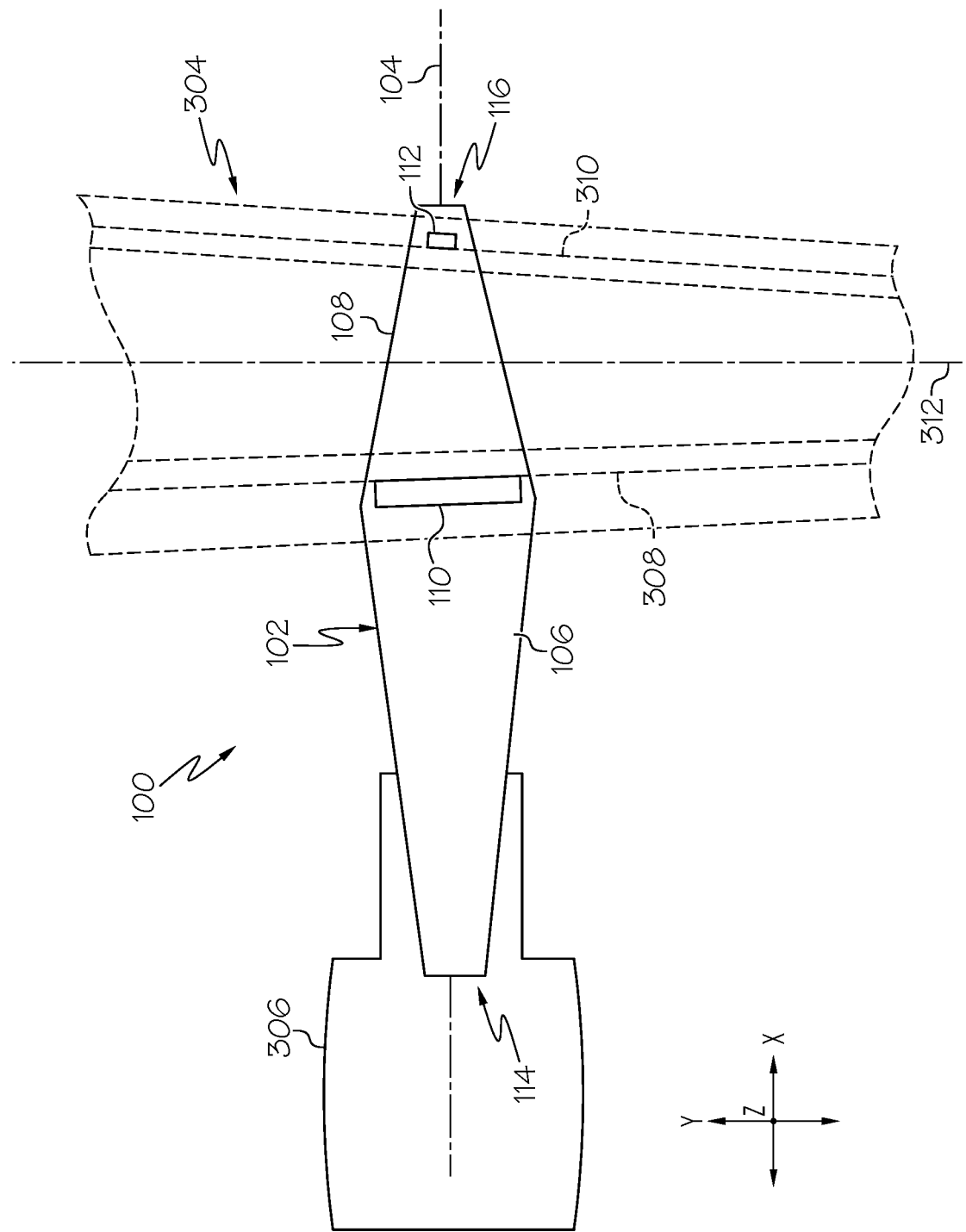
FIG. 4 is a schematic, top plan view of the example of the engine attachment system shown in FIG. 3.

FIGS. 3 and 4 schematically illustrate examples of engine attachment system 100. Throughout the present disclosure, the disclosed engine attachment system 100 may also be referred to simply as the system 100.

In one or more examples, the wing 304 includes at least a forward spar 308 and an aft spar 310 (e.g., as shown in FIGS. 3 and 4). Generally, the forward spar 308 and the aft spar 310 extend along the spanwise axis 312 of the wing 304 and provide primary structural integrity of the wing 304 (e.g., the primary load-bearing structural members of the wing 304). In one or more examples, the wing 304 may also include one or more additional spanwise structural members, for example, intermediate spars or mid-spars located between the forward spar 308 and the aft spar 310, a forward-most spar located forward of the forward spar 308, and/or an aft-most spar located aftward of the aft spar 310.

In one or more examples, the forward spar 308 refers to one of the spanwise structural members (e.g., spars) that is situated in a generally forward position of the wing 304 or that is situated forward of the spanwise axis 312 (e.g., the midline) of the wing 304. In one or more examples, the forward spar 308 is a forward-most (e.g., front) spar of the wing 304, such as when the wing 304 is a high aspect ratio wing.

In one or more examples, the aft spar 310 refers to one of the spanwise structural members (e.g., spars) that is situated in an aft position of the wing 304, that is situated aft of the forward spar 308, or that is situated aft of the spanwise axis 312 (e.g., the midline) of the wing 304. In one or more examples, the aft spar 310 is an aft-most (e.g., rear) spar of the wing 304, such as when the wing 304 is a high aspect ratio wing. In one or more examples, the aft spar 310 refers to an intermediate or mid-spar located between a forward-most spar and an aft-most spar of the wing 304.

In one or more examples, the system 100 includes a strut box 102, a forward attachment apparatus 110, and an aft attachment apparatus 112. The system 100 provides the mounting or attachment structure for attaching the engine 306 to the wing 304 of the aircraft 300 (e.g., as shown in FIGS. 1 and 2). The strut box 102 is coupled to the wing 304 by the forward attachment apparatus 110 and the aft attachment apparatus 112. The strut box 102 is coupleable to the engine 306. For example, the engine 306 is coupled to the strut box 102 using any number of engine attachment fittings (e.g., as shown in FIG. 3). In FIGS. 3 and 4, the cowling 328 and the fairing 330 (e.g., as shown in FIG. 2) have been removed for clarity of illustration.

In one or more examples, the strut box 102 includes a longitudinal axis 104. The strut box 102 includes a forward end 114 and an aft end 116 that is opposite the forward end 114 along the longitudinal axis 104. The strut box 102 includes an inboard side 118 and an outboard side 120 that is opposite the inboard side 118 transverse to the longitudinal axis 104. The strut box 102 includes a forward portion 106 and an aft portion 108. The forward portion 106 extends along the longitudinal axis 104 to the forward end 114. The aft portion 108 extends aftward (e.g., in the direction of a rear of the aircraft 300) from the forward portion 106 to the aft end 116 along the longitudinal axis 104.

For the purpose of the present disclosure, the term "forward" refers to a relative location or direction toward the front of the aircraft 300. The term "aft" refers to a relative location or direction toward the rear of the aircraft 300. The term "inboard" refers to a relative location or direction toward a midline of the aircraft 300. The term "outboard" refers to a relative location or direction away from the midline of the aircraft 300.

Generally, when the strut box 102 is coupled to the wing 304 by the forward attachment apparatus 110 and the aft attachment apparatus 112, the aft portion 108 of the strut box 102 is positioned under the wing 304 (e.g., as shown in FIGS. 3 and 4). In one or more examples, the aft portion 108 of the strut box 102 refers to a portion of the strut box 102 that is situated under the wing 304. In one or more examples, the forward portion 106 of the strut box 102 refers to a portion of the strut box 102 that extends forward of the wing 304. However, in one or more examples, a portion of the forward portion 106 of the strut box 102 may also be situated under the wing 304. As an example, the forward portion 106 of the strut box 102 may refer to a portion of the strut box 102 that is located under the forward spar 308 of the wing 304 and a portion of the strut box 102 that extends forward from the forward spar 308 of the wing 304 (e.g., as shown in FIGS. 3 and 4). In one or more examples, when the strut box 102 is coupled to the wing 304 by the forward attachment apparatus 110 and the aft attachment apparatus 112, the aft portion 108 of the strut box 102 transverses a midline or central spanwise axis (e.g., the spanwise axis 312) of the wing 304. In one or more examples, when the strut box 102 is coupled to the wing 304 by the forward attachment apparatus 110 and the aft attachment apparatus 112, the aft end 116 of the strut box 102 is located proximate to the aft spar 310 (e.g., aft-most spar or mid-spar) of the wing 304 (e.g., as shown in FIGS. 3 and 4).

The forward attachment apparatus 110 is coupled to the strut box 102, such as to the forward portion 106 of the strut box 102. The forward attachment apparatus 110 is coupleable to a forward portion of the wing 304, such as the forward spar 308 of the wing 304. In one or more examples, the forward attachment apparatus 110 is coupled to the strut box 102 between the forward end 114 and the aft end 116 of the strut box 102. As an example, the forward attachment apparatus 110 is coupled to the forward spar 308 of the wing 304 and to the forward portion 106 of the strut box 102 that is situated below (e.g., directly below) the forward spar 308 (e.g., as shown in FIGS. 3 and 4).

The aft attachment apparatus 112 is coupled to the strut box 102, such as to the aft portion 108 of the strut box 102. The aft attachment apparatus 112 is coupleable to an aft portion of the wing 304, such as the aft spar 310 of the wing 304. In one or more examples, the aft attachment apparatus 112 is coupled to the strut box 102 proximate the aft end 116 of the strut box 102. As an example, the aft attachment apparatus 112 is coupled to the aft spar 310 of the wing 304 and to the aft portion 108 of the strut box 102 that is situated below (e.g., directly below) the aft spar 310 (e.g., as shown in FIGS. 3 and 4).

The forward attachment apparatus 110 and the aft attachment apparatus 112 are configured to react to all directions of forces and moments applied to the strut box 102. As an example, the forward attachment apparatus 110 and the aft attachment apparatus 112 cooperatively react to all directions of forces and moments applied to the strut box 102. As an example, each one of the forward attachment apparatus 110 and the aft attachment apparatus 112 reacts to one or more directions of forces (or components thereof) and moments applied to the strut box 102. Such forces and moments may be applied to the strut box 102 in response to loads applied from the engine 306 to the wing 304 and loads applied from the wing 304 to the engine 306. Reacting to all directions of forces and moments applied to the strut box 102 using the forward attachment apparatus 110 and the aft attachment apparatus 112 provides a statically determinate system.

All directions of forces and moments applied to the strut box 102 refers to all directions of transverse forces applied to the strut box 102 and moments occurring in response to one or more of such forces. In one or more examples, the directions of forces may be expressed as directional forces along orthogonal axes relative to a fixed aircraft coordinate system, such as an X, Y, Z-coordinate system (e.g., as shown in FIGS. 2-10). As an example, an X-directional force refers to a load or force, or a component thereof, applied to the strut box 102 and reacted by the system 100 in an X-direction or along the X-axis. As an example, the X-directional force includes an axial load, for example, caused by thrust from the engine 306. As an example, a Y-directional force refers to a load or force, or a component thereof, applied to the strut box 102 and reacted by the system 100 in a Y-direction or along the Y-axis. As an example, the Y-directional force includes side loads, for example, created by wind buffeting). As an example, the Z-directional force refers to a load or force, or a component thereof, applied to the strut box 102 and reacted by the system 100 in a Z-direction or along the Z-axis. As an example, the Z-direction force includes vertical loads, for example, caused by the weight of the engine plus maneuver loads. As an example, an X-directional moment refers to a moment about the X-axis. As an example, the X-directional moment includes a roll moment. As an example, a Y-directional moment refers to a moment about the Y-axis. As an example, the Y-directional moment includes a pitch moment. As an example, a Z-directional moment refers to a moment about the Z-axis. As an example, the Z-directional moment includes a yaw moment.

Figure 5:
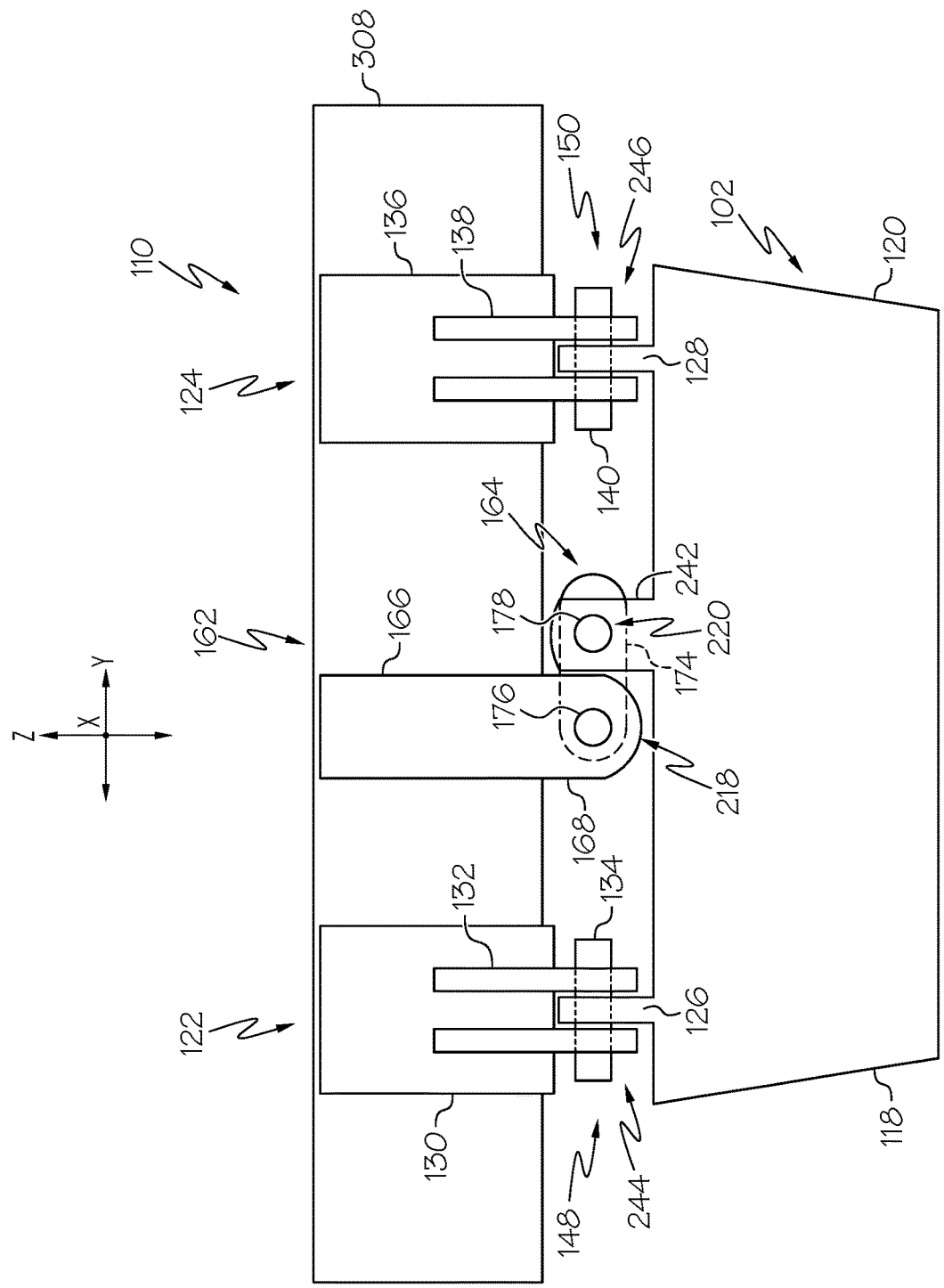
FIG. 5 is a schematic, front elevation view of an example of a forward attachment apparatus of the engine attachment system.

FIG. 5 schematically illustrates an example of the forward attachment apparatus 110. In one or more examples, the forward attachment apparatus 110 includes an inboard forward fitting 122 (e.g., a first forward fitting), an outboard forward fitting 124 (e.g., a second forward fitting), and a central forward fitting 162 (e.g., a third forward fitting). In these examples, the forward attachment apparatus 110 provides three attachment or joint interfaces formed between the strut box 102 and the wing 304.

Generally, the inboard forward fitting 122 and the outboard forward fitting 124 are spaced apart from each other along the forward spar 308 of the wing 304. The relative (e.g., spaced apart) locations of the inboard forward fitting 122 and the outboard forward fitting 124 enable a moment reaction across an inboard interface between the strut box 102 and the forward spar 308 of the wing 304 (e.g., formed by the inboard forward fitting 122) and an outboard interface between the strut box 102 and the forward spar 308 of the wing 304 (e.g., formed by the outboard forward fitting 124). The central forward fitting 162 is located between the inboard forward fitting 122 and the outboard forward fitting 124 along the forward spar 308 of the wing 304.

In one or more examples, the inboard forward fitting 122 is coupleable to the forward spar 308 of the wing 304. The inboard forward fitting 122 is coupled to the strut box 102. In one or more examples, the inboard forward fitting 122 is coupled to the forward portion 106 of the strut box 102 proximate the inboard side 118 of the strut box 102. In one or more examples, the inboard forward fitting 122 is coupled to the forward portion 106 of the strut box 102 at the inboard side 118 of the strut box 102 by an inboard forward pin connection 148 (e.g., a first forward pin connection).

In one or more examples, the outboard forward fitting 124 is coupleable to the forward spar 308 of the wing 304. The outboard forward fitting 124 is coupled to the strut box 102. In one or more examples, the outboard forward fitting 124 is coupled to the forward portion 106 of the strut box 102 proximate the outboard side 120 of the strut box 102. In one or more examples, the outboard forward fitting 124 is coupled to the forward portion 106 of the strut box 102 at the outboard side 120 of the strut box 102 by an outboard forward pin connection 150 (e.g., a second forward pin connection).

In one or more examples, the central forward fitting 162 is coupleable to the forward spar 308 of the wing 304 between the inboard forward fitting 122 and the outboard forward fitting 124. The central forward fitting 162 is coupled to the strut box 102. In one or more examples, the central forward fitting 162 is coupled to the forward portion 106 of the strut box 102 between the inboard side 118 and the outboard side 120 of the strut box 102. In one or more examples, the central forward fitting 162 is coupled to the forward portion 106 of the strut box 102 between the inboard side 118 and the outboard side 120 of the strut box 102 by a central forward pin connection 164 (e.g., a third forward pin connection).

Figure 6:
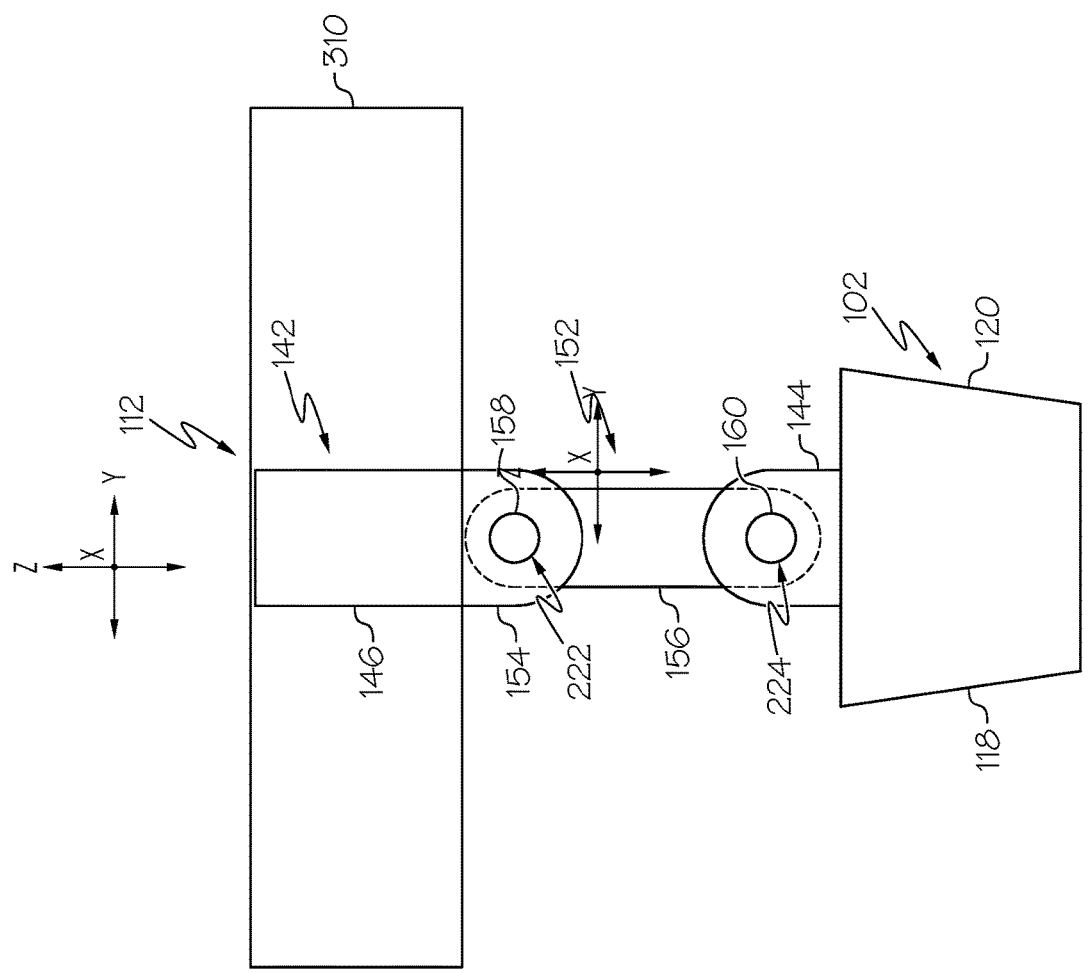
FIG. 6 is a schematic, front elevation view of an example of an aft attachment apparatus of the engine attachment system.

FIG. 6 schematically illustrates an example of the aft attachment apparatus 112. In one or more examples, the aft attachment apparatus 112 includes an aft fitting 142. In these examples, the aft attachment apparatus 112 provides one attachment or joint interface between the strut box 102 and the wing 304. As such, in one or more examples, the system 100 provides four attachment or joint interfaces formed between the strut box 102 and the wing 304, including three forward attachment interfaces (e.g., as shown in FIG. 5) and one aft attachment interface (e.g., as shown in FIG. 6).

Generally, the aft fitting 142 is spaced apart from the inboard forward fitting 122, the outboard forward fitting 124, and the central forward fitting 162 along the longitudinal axis 104 of the strut box 102. The relative (e.g., spaced apart) locations of the aft fitting 142, the inboard forward fitting 122, the outboard forward fitting 124, and the central forward fitting 162 enable a moment reaction across an aft interface between the strut box 102 and the aft spar 310 of the wing 304 (e.g., formed by the aft fitting 142) and a forward interface between the strut box 102 and the forward spar 308 of the wing 304 (e.g., formed by the inboard forward fitting 122, the outboard forward fitting 124, and/or the central forward fitting 162).

In one or more examples, the aft fitting 142 is coupleable to the aft spar 310 of the wing 304. The aft fitting 142 is coupled to the strut box 102. In one or more examples, the aft fitting 142 is coupled to the aft portion 108 of the strut box 102 proximate the aft end 116 of the strut box 102. In one or more examples, the aft fitting 142 is coupled to the aft end 116 of the strut box 102 by an aft pin connection 152.

Referring generally to FIGS. 3-6, in one or more examples of the system 100, which include an example combination of the forward attachment apparatus 110 and the aft attachment apparatus 112 as described above and illustrated in FIGS. 5 and 6, the inboard forward fitting 122 and the outboard forward fitting 124 are configured to react to an X-directional force applied to the strut box 102. As an example, the inboard forward fitting 122 and the outboard forward fitting 124 cooperatively react to the X-directional force applied to the strut box 102. As another example, each one of the inboard forward fitting 122 and the outboard forward fitting 124 reacts to the X-directional force, or a component or a portion of the X-directional force, applied to the strut box 102. In these examples, the inboard forward fitting 122 and the outboard forward fitting 124 provide a redundant load path to react to the X-directional force applied to the strut box 102.

In one or more examples of the system 100, which include an example combination of the forward attachment apparatus 110 and the aft attachment apparatus 112 as described above and illustrated in FIGS. 5 and 6, the central forward fitting 162 is configured to react to a Y-directional force applied to the strut box 102.

In one or more examples of the system 100, which include an example combination of the forward attachment apparatus 110 and the aft attachment apparatus 112 as described above and illustrated in FIGS. 5 and 6, the inboard forward fitting 122, the outboard forward fitting 124, and the aft fitting 142 are configured to react to a Z-directional force applied to the strut box 102. As an example, the inboard forward fitting 122, the outboard forward fitting 124, and the aft fitting 142 cooperatively react to the Z-directional force applied to the strut box 102. As another example, each one of the inboard forward fitting 122, the outboard forward fitting 124, and the aft fitting 142 reacts to the Z-directional force, or a component or a portion of the Z-directional force, applied to the strut box 102. In these examples, the inboard forward fitting 122, the outboard forward fitting 124, and the aft fitting 142 provide a redundant load path to react to the Z-directional force applied to the strut box 102.

In one or more examples of the system 100, which include an example combination of the forward attachment apparatus 110 and the aft attachment apparatus 112 as described above and illustrated in FIGS. 5 and 6, the inboard forward fitting 122 and the outboard forward fitting 124 are configured to react to an X-directional moment applied to the strut box 102. As an example, the inboard forward fitting 122 and the outboard forward fitting 124 cooperatively react to the X-directional moment applied to the strut box 102.

In one or more examples of the system 100, which include an example combination of the forward attachment apparatus 110 and the aft attachment apparatus 112 as described above and illustrated in FIGS. 5 and 6, the inboard forward fitting 122, the outboard forward fitting 124, and the aft fitting 142 are configured to react to a Y-directional moment applied to the strut box 102. As an example, the inboard forward fitting 122, the outboard forward fitting 124, and the aft fitting 142 cooperatively react to the Y-directional moment applied to the strut box 102.

In one or more examples of the system 100, which include the forward attachment apparatus 110 and the aft attachment apparatus 112 as described above and illustrated in FIGS. 5 and 6, the inboard forward fitting 122 and the outboard forward fitting 124 are configured to react to a Z-directional moment applied to the strut box 102. As an example, the inboard forward fitting 122 and the outboard forward fitting 124 cooperatively react to the Z-directional moment applied to the strut box 102.

Figure 7:
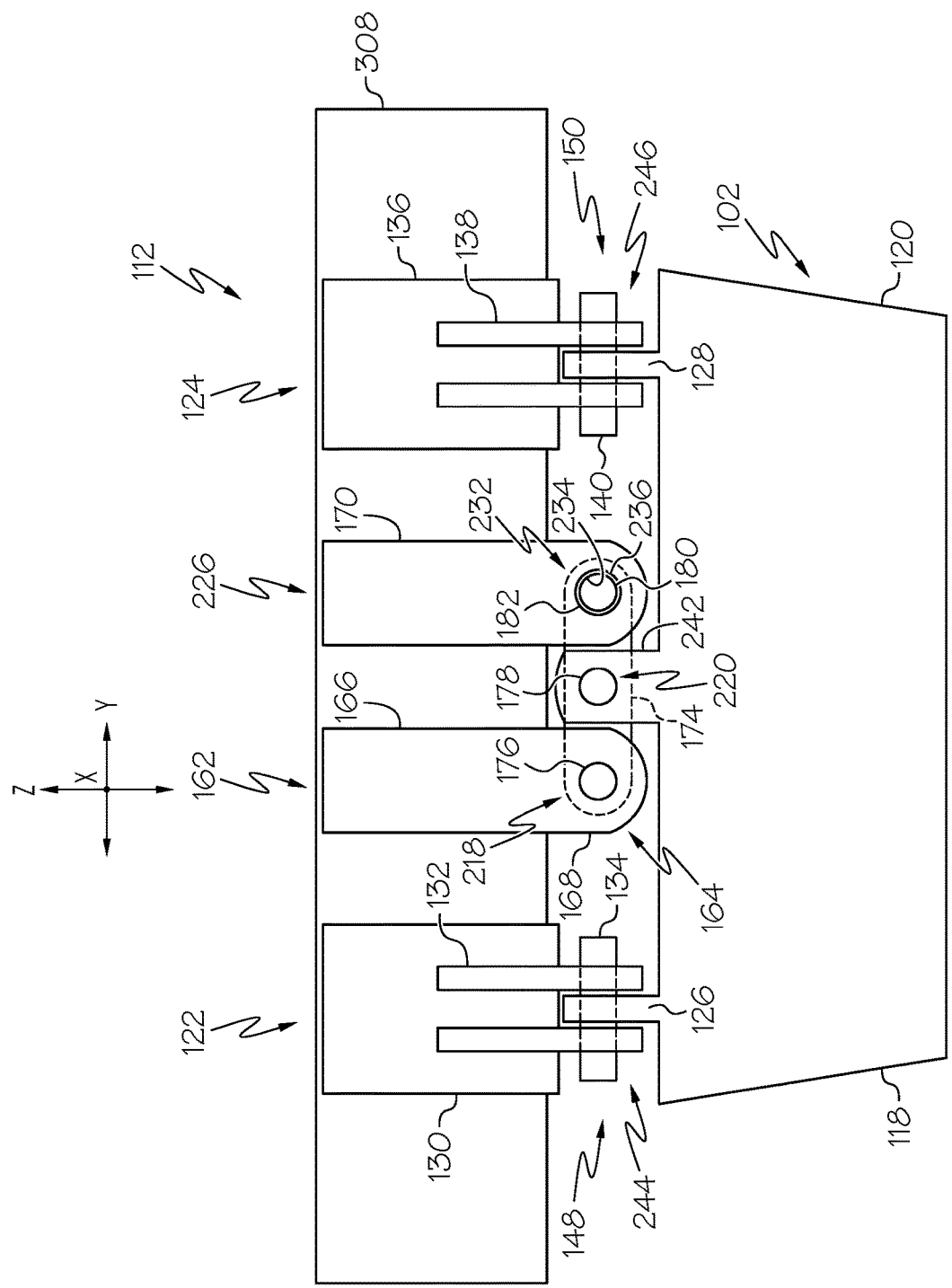
FIG. 7 is a schematic, front elevation view of an example of the forward attachment apparatus of the engine attachment system.
Figure 8:
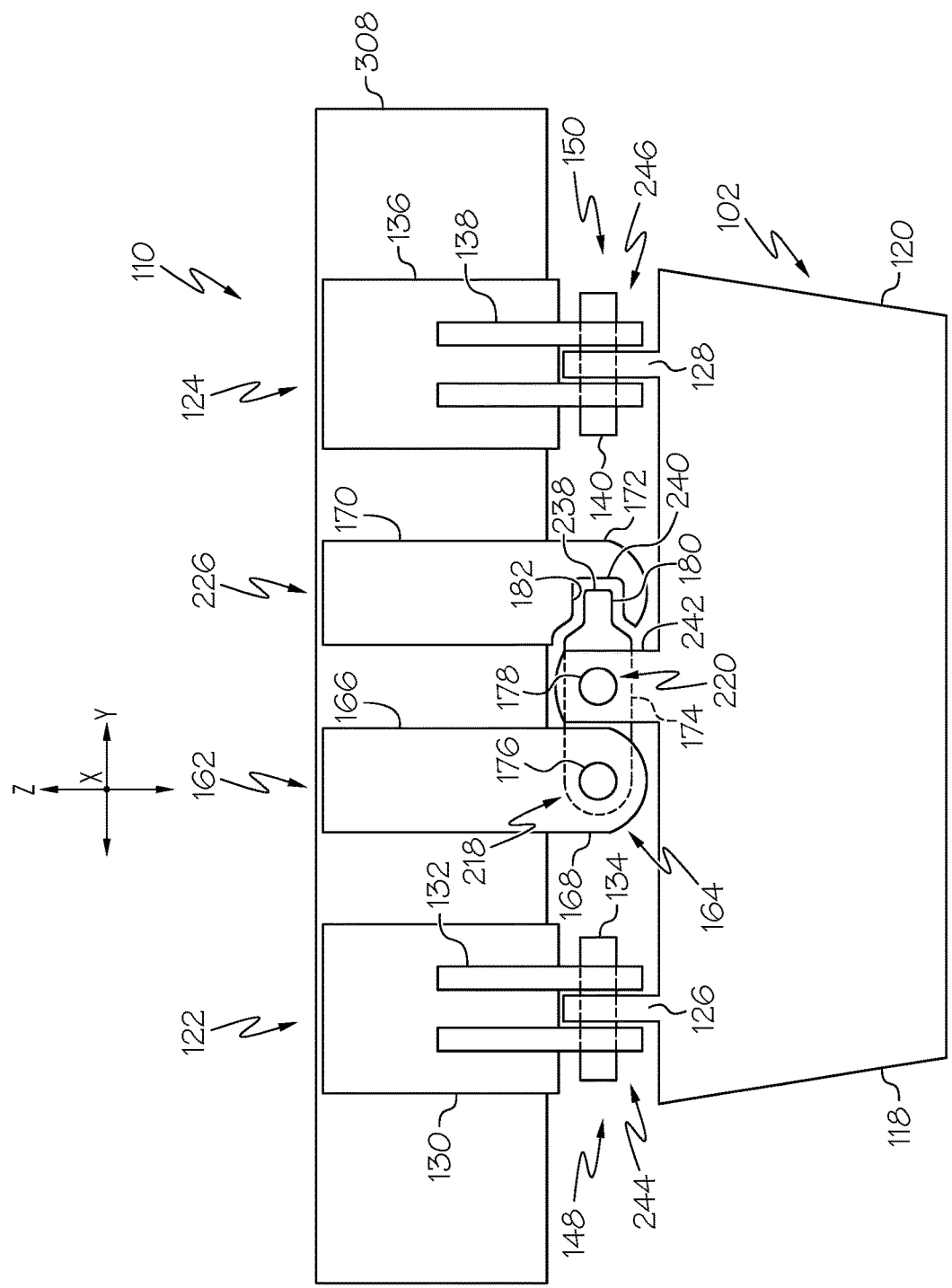
FIG. 8 is a schematic, front elevation view of an example of the forward attachment apparatus of the engine attachment system.

FIGS. 7 and 8 schematically illustrate examples of the forward attachment apparatus 110. In one or more examples, the forward attachment apparatus 110 includes the inboard forward fitting 122 (e.g., the first forward fitting), the outboard forward fitting 124 (e.g., the second forward fitting), and the central forward fitting 162 (e.g., the third forward fitting). The forward attachment apparatus 110 also includes a forward catcher fitting 226 (e.g., a fourth forward fitting). The forward catcher fitting 226 is unloaded during normal operation of the system 100. Should a primary loaded fitting (e.g., a non-catcher fitting) of the forward attachment apparatus 110 (e.g., the inboard forward fitting 122 or the outboard forward fitting 124) fail, the forward catcher fitting 226 is capable of cooperating with the remaining unfailed fittings to carry the loads. In these examples, the forward attachment apparatus 110 provides three normally loaded attachment or joint interfaces formed between the strut box 102 and the wing 304 and a normally unloaded failsafe or alternate attachment or joint interface between the strut box 102 and the wing 304.

Generally, the forward catcher fitting 226 is located between the central forward fitting 162 and the inboard forward fitting 122 along the forward spar 308 or is located between the central forward fitting 162 and the outboard forward fitting 124 along the forward spar 308 (e.g., as shown in FIGS. 7 and 8).

In one or more examples, the forward catcher fitting 226 is coupleable to the forward spar 308 of the wing 304. The forward catcher fitting 226 is coupled to the strut box 102. In one or more examples, the forward catcher fitting 226 is coupled to the forward portion 106 of the strut box 102 between the inboard side 118 and the outboard side 120 of the strut box 102. In one or more examples, the forward catcher fitting 226 is coupled to the forward portion 106 of the strut box 102 between the inboard side 118 and the outboard side 120 of the strut box 102 by a forward catch connection 232.

Figure 9:
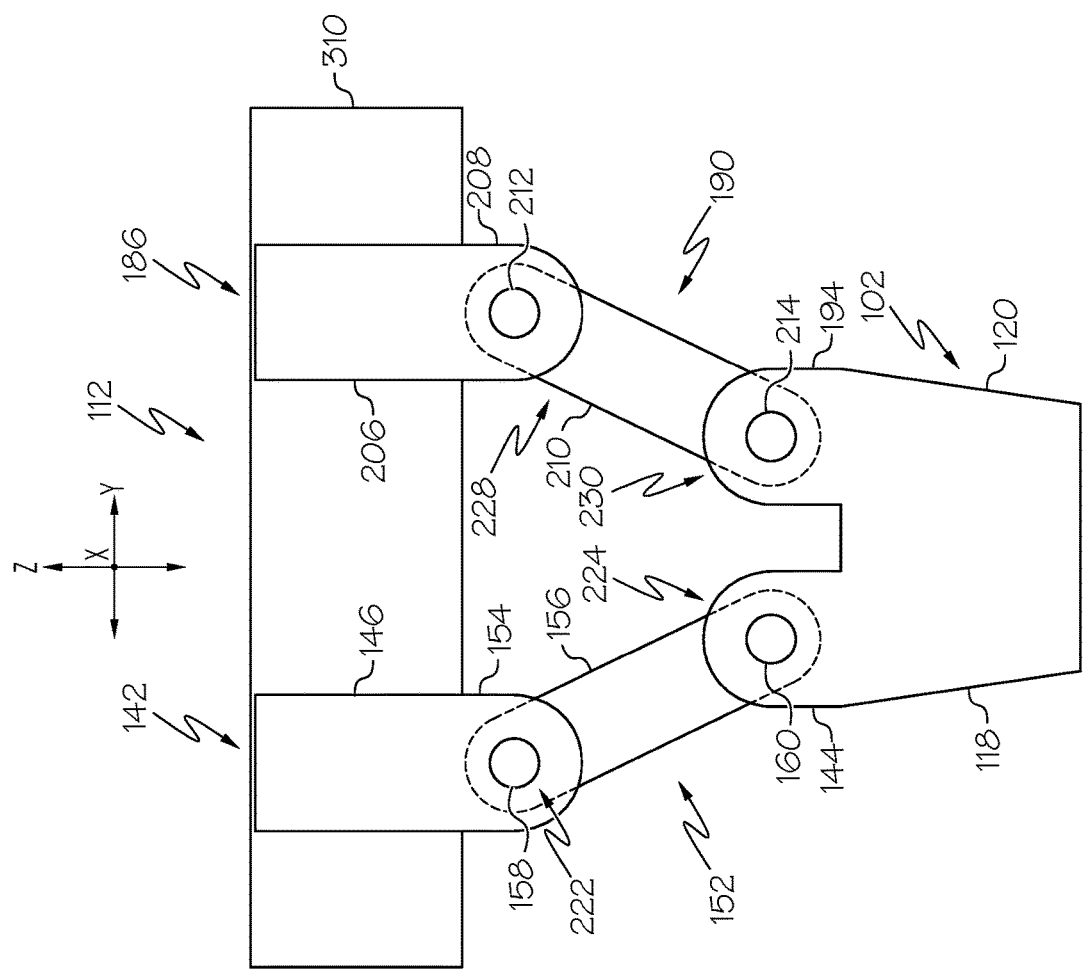
FIG. 9 is a schematic, front elevation view of an example of the aft attachment apparatus of the engine attachment system.

FIG. 9 schematically illustrates an example of the aft attachment apparatus 112. In one or more examples of the aft attachment apparatus 112, the aft fitting 142 (e.g., a first aft fitting or inboard aft fitting) is coupled to the aft end 116 of the strut box 102 proximate the inboard side 118 of the strut box 102. The aft attachment apparatus 112 also includes a second aft fitting 186 (e.g., an outboard aft fitting). In these examples, the aft attachment apparatus 112 provides two attachment or joint interfaces between the strut box 102 and the wing 304. As such, in one or more examples, the system 100 provides five attachment or joint interfaces formed between the strut box 102 and the wing 304, including three forward attachment interfaces (e.g., as shown in FIGS. 7 and 8), two aft attachment interfaces (e.g., as shown in FIG. 9), and one failsafe or alternate forward attachment interface (e.g., as shown in FIGS. 7 and 8).

Generally, the aft fitting 142 and the second aft fitting 186 are spaced apart from each other along the aft spar 310 of the wing 304. The relative (e.g., spaced apart) locations of the aft fitting 142 and the second aft fitting 186 enable a moment reaction across an inboard interface between the strut box 102 and the aft spar 310 of the wing 304 (e.g., formed by the aft fitting 142) and an outboard interface between the strut box 102 and the aft spar 310 of the wing 304 (e.g., formed by the second aft fitting 186). The aft fitting 142 and the second aft fitting 186 are spaced apart from the inboard forward fitting 122, the outboard forward fitting 124, and the central forward fitting 162 along the longitudinal axis 104 of the strut box 102. The relative (e.g., spaced apart) locations of the aft fitting 142, the second aft fitting 186, the inboard forward fitting 122, the outboard forward fitting 124, and the central forward fitting 162 enable a moment reaction across an aft interface between the strut box 102 and the aft spar 310 of the wing 304 (e.g., formed by the aft fitting 142 and/or the second aft fitting 186) and a forward interface between the strut box 102 and the forward spar 308 of the wing 304 (e.g., formed by the inboard forward fitting 122, the outboard forward fitting 124, and/or the central forward fitting 162).

In one or more examples, the second aft fitting 186 is coupleable to the aft spar 310 of the wing 304. The second aft fitting 186 is coupled to the strut box 102. In one or more examples, the aft fitting 142 is coupled to the aft portion 108 of the strut box 102 proximate the aft end 116 of the strut box 102. In one or more examples, the aft fitting 142 is coupled to the aft end 116 of the strut box 102 proximate the inboard side 118 of the strut box 102 and the second aft fitting 186 is coupled to the aft end 116 of the strut box 102 proximate the outboard side 120 of the strut box 102. In one or more examples, the second aft fitting 186 is coupled to the aft end 116 of the strut box 102 by a second aft pin connection 190.

Referring generally to FIGS. 3, 4 and 7-10, in one or more examples of the system 100, which include an example combination of the forward attachment apparatus 110 and the aft attachment apparatus 112 as described above and illustrated in FIGS. 7-10, the inboard forward fitting 122 and the outboard forward fitting 124 are configured to react to the X-directional force applied to the strut box 102. As an example, the inboard forward fitting 122 and the outboard forward fitting 124 cooperatively react to the X-directional force applied to the strut box 102. As another example, each one of the inboard forward fitting 122 and the outboard forward fitting 124 reacts to the X-directional force, or a component or a portion of the X-directional force, applied to the strut box 102. In these examples, the inboard forward fitting 122 and the outboard forward fitting 124 provide a redundant load path to react to the X-directional force applied to the strut box 102.

In one or more examples of the system 100, which include an example combination of the forward attachment apparatus 110 and the aft attachment apparatus 112 as described above and illustrated in FIGS. 7-10, the central forward fitting 162, the aft fitting 142, and the second aft fitting 186 are configured to react to the Y-directional force applied to the strut box 102. As an example, the central forward fitting 162, the aft fitting 142, and the second aft fitting 186 cooperatively react to the Y-directional force applied to the strut box 102. As another example, each one of the central forward fitting 162, the aft fitting 142, and the second aft fitting 186 reacts to the Y-directional force, or a component or a portion of the Y-directional force, applied to the strut box 102. In these examples, the central forward fitting 162, the aft fitting 142, and the second aft fitting 186 provide a redundant load path to react to the Y-directional force applied to the strut box 102.

In one or more examples of the system 100, which include an example combination of the forward attachment apparatus 110 and the aft attachment apparatus 112 as described above and illustrated in FIGS. 7-10, the inboard forward fitting 122, the outboard forward fitting 124, the aft fitting 142, and the second aft fitting 186 are configured to react to the Z-directional force applied to the strut box 102. As an example, the inboard forward fitting 122, the outboard forward fitting 124, the aft fitting 142, and the second aft fitting 186 cooperatively react to the Z-directional force applied to the strut box 102. As another example, each one of the inboard forward fitting 122, the outboard forward fitting 124, the aft fitting 142, and the second aft fitting 186 reacts to the Z-directional force, or a component or a portion of the Z-directional force, applied to the strut box 102. In these examples, the inboard forward fitting 122, the outboard forward fitting 124, the aft fitting 142, and the second aft fitting 186 provide a redundant load path to react to the Z-directional force applied to the strut box 102.

In one or more examples of the system 100, which include an example combination of the forward attachment apparatus 110 and the aft attachment apparatus 112 as described above and illustrated in FIGS. 7-10, the inboard forward fitting 122, the outboard forward fitting 124, the aft fitting 142, and the second aft fitting 186 are configured to react to the X-directional moment applied to the strut box 102. As an example, the inboard forward fitting 122, the outboard forward fitting 124, the aft fitting 142, and the second aft fitting 186 cooperatively react to the X-directional moment applied to the strut box 102.

In one or more examples of the system 100, which include an example combination of the forward attachment apparatus 110 and the aft attachment apparatus 112 as described above and illustrated in FIGS. 7-10, the inboard forward fitting 122, the outboard forward fitting 124, the aft fitting 142, and the second aft fitting 186 are configured to react to the Y-directional moment applied to the strut box 102. As an example, the inboard forward fitting 122, the outboard forward fitting 124, the aft fitting 142, and the second aft fitting 186 cooperatively react to the Y-directional moment applied to the strut box 102.

In one or more examples of the system 100, which include an example combination of the forward attachment apparatus 110 and the aft attachment apparatus 112 as described above and illustrated in FIGS. 7-10, the inboard forward fitting 122 and the outboard forward fitting 124 are configured to react to the Z-directional moment applied to the strut box 102. As an example, the inboard forward fitting 122 and the outboard forward fitting 124 cooperatively react to the Z-directional moment applied to the strut box 102.

In one or more examples of the system 100, which include an example combination of the forward attachment apparatus 110 and the aft attachment apparatus 112 as described above and illustrated in FIGS. 7-10, at least one of the inboard forward fitting 122, the outboard forward fitting 124, the central forward fitting 162, the catcher fitting 226, the aft fitting 142, and the second aft fitting 186 provide an alternate failsafe load path upon a failure of another one of the inboard forward fitting 122, the outboard forward fitting 124, the central forward fitting 162, the aft fitting 142, and the second aft fitting 186.

As an example, the inboard forward fitting 122 and the outboard forward fitting 124 are configured to provide a failsafe load path to react to the Y-directional force applied to the strut box 102 upon a failure of the central forward fitting 162. For example, upon a failure of the central forward fitting 162, at least one of the inboard forward fitting 122 and the outboard forward fitting 124 reacts to the Y-directional force, or a portion of component of the Y-directional force, applied to the strut box 102 that was reacted by the central forward fitting 162 prior to failure.

As another example, one of the aft fitting 142 and the second aft fitting 186 is configured to provide a failsafe load path to react to the Y-directional force and the Z-directional force to the strut box 102 upon a failure of another one of the aft fitting 142 and the second aft fitting 186. For example, upon a failure of the aft fitting 142 (or, alternatively, the second aft fitting 186), the second aft fitting 186 (or, alternatively, the aft fitting 142) reacts to the Y-directional force and the Z-directional force, or a portion of component of the Y-directional force and the Z-directional force, applied to the strut box 102 that was reacted by the aft fitting 142 (or, alternatively, the second aft fitting 186) prior to failure.

As another example, the inboard forward fitting 122, the outboard forward fitting 124, and the one of the aft fitting 142 and the second aft fitting 186 provide a redundant load path to react to the Y-directional moment and the Z-directional moment applied to the strut box 102 upon the failure of the another one of the aft fitting 142 and the second aft fitting 186. For example, upon a failure of the aft fitting 142 (or, alternatively, the second aft fitting 186), the inboard forward fitting 122, the outboard forward fitting 124, and the second aft fitting 186 (or, alternatively, the aft fitting 142) react to the Y-directional moment and the Z-directional moment applied to the strut box 102.

As another example, the catcher fitting 226 is configured to provide a failsafe load path to react to the Z-directional force and the X-directional moment applied to the strut box 102 upon a failure of one of the inboard forward fitting 122 and the outboard forward fitting 124. For examples, upon a failure of the inboard forward fitting 122 (or, alternatively, the outboard forward fitting 124), the catcher fitting 226 engages and reacts to the Z-directional force, or a portion or component of the Z-directional force, and the X-directional moment, or a portion of the X-directional moment, applied to the strut box 102 that was reacted by the inboard forward fitting 122 (or, alternatively, the outboard forward fitting 124) prior to failure.

As another example, the aft fitting 142, the second aft fitting 186, and one of the inboard forward fitting 122 and the outboard forward fitting 124 provide a redundant load path to react to the Y-directional moment applied to the strut box 102 upon the failure of another one of the inboard forward fitting 122 and the outboard forward fitting 124. For example, upon failure of the inboard forward fitting 122 (or, alternatively, the outboard forward fitting 124), the aft fitting 142, the second aft fitting 186, and the outboard forward fitting 124 (or, alternatively, the inboard forward fitting 122) react to the Y-directional moment, or a portion of the Y-directional moment, applied to the strut box 102 that was reacted by the inboard forward fitting 122 (or, alternatively, the outboard forward fitting 124) prior to failure.

As another example, one of the inboard forward fitting 122 and the outboard forward fitting 124 provides a redundant load path to react to the Z-directional moment applied to the strut box 102 upon the failure of another one of the inboard forward fitting 122 and the outboard forward fitting 124 and/or upon the failure of one of the aft fitting 142 or the second aft fitting 186. For example, upon failure of the inboard forward fitting 122 (or, alternatively, the outboard forward fitting 124), the outboard forward fitting 124 (or, alternatively, the inboard forward fitting 122) reacts to the Z-directional moment, or a portion of the Z-directional moment, applied to the strut box 102 that was reacted by the inboard forward fitting 122 (or, alternatively, the outboard forward fitting 124) prior to failure. For example, upon failure of one of the aft fitting 142 or the second aft fitting 186, the outboard forward fitting 124 and/or the inboard forward fitting 122 reacts to the Z-directional moment, or a portion of the Z-directional moment, applied to the strut box 102 that was reacted by the one of the aft fitting 142 or the second aft fitting 186 prior to failure Referring to FIG. 5, in one or more examples, the inboard forward pin connection 148 includes an inboard double shear connection 244 (e.g., a first double shear connection) between the inboard forward fitting 122 and the forward portion 106 of the strut box 102. The outboard forward pin connection 150 includes an outboard double shear connection 246 (e.g., a second double shear connection) between the outboard forward fitting 124 and the forward portion 106 of the strut box 102. The central forward pin connection 164 includes a central forward-fitting link 174. The central forward pin connection 164 includes a first central double shear connection 218 (e.g., a third double shear connection) between the central forward fitting 162 and the central forward-fitting link 174. The central forward pin connection 164 includes a second central double shear connection 220 (e.g., a fourth double shear connection) between the central forward-fitting link 174 and the forward portion 106 of the strut box 102.

Referring to FIG. 6, in one or more examples, the aft pin connection 152 includes an aft-fitting link 156. The aft pin connection 152 includes a first aft double shear connection 222 (e.g., a fifth double shear connection) between the aft fitting 142 and the aft-fitting link 156. The aft pin connection 152 includes a second aft double shear connection 224 (e.g., a sixth double shear connection) between the aft-fitting link 156 and the aft end 116 of the strut box 102.

Referring to FIGS. 7 and 8, in one or more examples, the forward catch connection 232 includes a catcher 180 and a catcher opening 182. The catcher opening 182 is configured to receive the catcher 180. In one or more examples, the catcher 180 is coupled to or extends from an end of the central forward-fitting link 174. As an example, the central forward-fitting link 174 includes the catcher 180 (e.g., the catcher 180 forms a portion of the central forward-fitting link 174). In one or more examples, the catcher opening 182 is formed in the forward catcher fitting 226. As an example, the forward catcher fitting 226 includes the catcher opening 182.

Referring to FIG. 9, in one or more examples, the second aft pin connection 190 includes a second aft-fitting link 210. The second aft pin connection 190 includes a third aft double shear connection 228 (e.g., a seventh double shear connection) between the second aft fitting 186 and the second aft-fitting link 210. The second aft pin connection 190 includes a fourth aft double shear connection 230 (e.g., an eighth double shear connection) between the second aft-fitting link 210 and the aft end 116 of the strut box 102.

In one or more examples, the aft-fitting link 156 and the second aft-fitting link 210 are oriented at an oblique angle relative to each other. The aft-fitting link 156 and the second aft-fitting link 210 are oriented to reside in the same plane, such as the YZ-plane (e.g., as shown in FIG. 9) or the XZ-plane. The relative angular orientation of the aft-fitting link 156 and the second aft-fitting link 210 enables the system 100 to react to the Y-directional forces and the Z-directional forces. Accordingly, the relative angle between the aft-fitting link 156 and the second aft-fitting link 210 enables the aft fitting 142 and the second aft fitting 186 to react both a vertical load and a side load together, which facilitates fail-safety during failure of one of the inboard forward fitting 122 or the outboard forward fitting 124.

Figure 10:
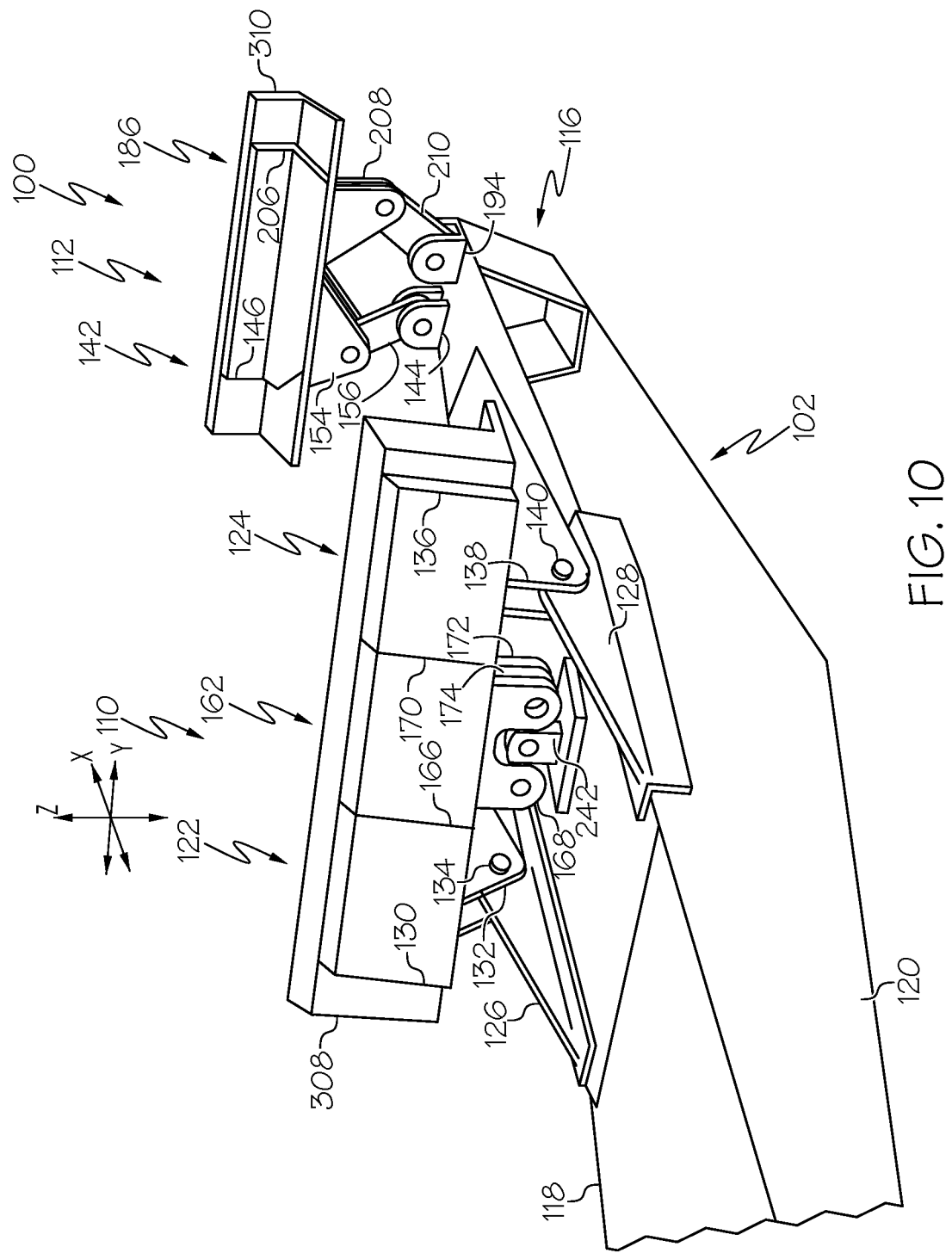
FIG. 10 is a schematic, perspective view of an example of the engine attachment system.

In the illustrative examples of the forward attachment apparatus 110 (e.g., as shown in FIGS. 5, 7, 8 and 10) and the aft attachment apparatus 112 (e.g., as shown in FIGS. 6, 9 and 10), each one of the pin connections (e.g., the inboard forward pin connection 148, the outboard forward pin connection 150, the central forward pin connection 164, the aft pin connection 152, and the second aft pin connection 190) includes or takes the form of a double shear connection (e.g., inboard double shear connection 244, the outboard double shear connection 246, the first central double shear connection 218, the second central double shear connection 220, the first aft double shear connection 222, the second aft double shear connection 224, the third aft double shear connection 228, and the fourth aft double shear connection 230). However, in other examples the forward attachment apparatus 110 and the aft attachment apparatus 112, one or more of the pin connections (e.g., the inboard forward pin connection 148, the outboard forward pin connection 150, the central forward pin connection 164, the aft pin connection 152, and/or the second aft pin connection 190) may include or take the form of another type of pin connection or pivot connection, such as a single shear connection.

As illustrated in FIGS. 5-10 and as described herein below, in one or more examples, the double shear connections (e.g., inboard double shear connection 244, the outboard double shear connection 246, the first central double shear connection 218, the second central double shear connection 220, the first aft double shear connection 222, the second aft double shear connection 224, the third aft double shear connection 228, and/or the fourth aft double shear connection 230) include or take the form of a clevis and a lug connected together by a pin. In the illustrated examples shown in FIGS. 5-10, the clevis-portion of the double shear connection is associated with one of a fitting of the forward attachment apparatus 110 and the aft attachment apparatus 112 or the strut box 102 and the lug-portion of the double shear connection is associated with an opposed one of the fitting of the forward attachment apparatus 110 and the aft attachment apparatus 112 or the strut box 102. However, in other non-illustrated examples, the arrangement or respective association of the clevis-portion and the lug-portion of any one of the double shear connections may be reversed. Selection of the arrangement of the clevis-portion and the lug-portion of the double shear connection may consider advantageous load distributions along the wing 304 (e.g., the forward spar 308 and/or the aft spar 310), advantageous spatial distributions, and the like.

As illustrated in FIGS. 5, 7, 8, and 10, in one or more examples, the strut box 102 includes an inboard strut-box lug 126, an outboard strut-box lug 128, and a forward strut-box clevis 242. The inboard strut-box lug 126 is located proximate to the inboard side 118 of the strut box 102. The outboard strut-box lug 128 is located proximate to the outboard side 120 of the strut box 102. The forward strut-box clevis 242 is located between the inboard strut-box lug 126 and the outboard strut-box lug 128.

As illustrated in FIGS. 5, 7, 8 and 10, in one or more examples, the inboard forward fitting 122 includes an inboard-forward-fitting bracket 130, an inboard-forward-fitting clevis 132, and an inboard-forward-fitting pin 134. The inboard-forward-fitting bracket 130 is coupleable to the forward spar 308 of the wing 304. The inboard-forward-fitting clevis 132 extends from the inboard-forward-fitting bracket 130 and is coupled to the inboard strut-box lug 126 by the inboard-forward-fitting pin 134.

As illustrated in FIGS. 5, 7, 8 and 10, in one or more examples, the outboard forward fitting 124 includes an outboard-forward-fitting bracket 136, an outboard-forward-fitting clevis 138, and an outboard-forward-fitting pin 140. The outboard-forward-fitting bracket 136 is coupleable to the forward spar 308 of the wing 304. The outboard-forward-fitting clevis 138 extends from the outboard-forward-fitting bracket 136 and is coupled to the outboard strut-box lug 128 by the outboard-forward-fitting pin 140.

As illustrated in FIGS. 5, 7, 8 and 10, in one or more examples, the central forward fitting 162 includes a central-forward-fitting bracket 166, a central-forward-fitting clevis 168, the central forward-fitting link 174, a first central-forward-fitting pin 176, and a second central-forward-fitting pin 178. The central-forward-fitting bracket 166 is coupleable to the forward spar 308 of the wing 304. The central-forward-fitting clevis 168 extends from the central-forward-fitting bracket 166. The central forward-fitting link 174 is coupled to the central-forward-fitting clevis 168 by the first central-forward-fitting pin 176. The central forward-fitting link 174 is coupled to the forward strut-box clevis 242 by the second central-forward-fitting pin 178. In these examples, the central forward-fitting link 174 is a two-force member.

As illustrated in FIGS. 7, 8 and 10, in one or more examples, forward catcher fitting 226 includes a forward-catcher-fitting bracket 170 and a forward-catcher-fitting catch 172. The forward-catcher-fitting bracket 170 is spaced apart from the central-forward-fitting bracket 166. The forward-catcher-fitting bracket 170 is coupleable to the forward spar 308 of the wing 304. The forward-catcher-fitting catch 172 extends from the forward-catcher-fitting bracket 170. The catcher opening 182 is formed in the forward-catcher-fitting catch 172 and receives the catcher 180 of the central forward-fitting link 174. The catcher opening 182 is sized larger than the catcher 180 such that in an intact state (e.g., non-failure of the inboard forward fitting 122 or the outboard forward fitting 124), the catcher 180 does not engage the forward-catcher-fitting catch 172 within the catcher opening 182. Upon failure of one of the inboard forward fitting 122 (e.g., the inboard forward pin connection 148) or the outboard forward fitting 124 (e.g., the outboard forward pin connection 150), the catcher 180 engages the forward-catcher-fitting catch 172 within the catcher opening 182.

As illustrated in FIG. 7, in one or more examples, the catcher 180 includes or takes the form of a catcher pin 234. The catcher pin 234 is coupled to the central forward-fitting link 174 and is spaced away from the second central-forward-fitting pin 178, opposite the first central-forward-fitting pin 176 along an axis of the central forward-fitting link 174. The catcher opening 182 includes or takes the form of a catcher aperture 236 (e.g., an opening having any suitable geometry) formed in the forward-catcher-fitting catch 172. In one or more examples, the forward-catcher-fitting catch 172 includes or takes the form of a clevis. An interface between the catcher pin 234 and the forward-catcher-fitting catch 172 within the catcher aperture 236 is normally unloaded. Upon failure of the inboard forward fitting 122 or the outboard forward fitting 124, the interface between the catcher pin 234 and the forward-catcher-fitting catch 172 within the catcher aperture 236 is loaded and provides an alternate failsafe load path. In one or more examples, a dimension (e.g., diameter) of the catcher pin 234 is less than a dimension (e.g., diameter) of the catcher aperture 236.

As illustrated in FIG. 8, the catcher 180 includes or takes the form of a catcher tab 238. The catcher tab 238 is coupled to and/or extends from the central forward-fitting link 174, opposite the first central-forward-fitting pin 176 along an axis of the central forward-fitting link 174. The catcher opening 182 includes or takes the form of a catcher slot 240 (e.g., an opening having any suitable geometry) formed in the forward-catcher-fitting catch 172. In one or more examples, the forward-catcher-fitting catch 172 includes or takes the form of a lug. An interface between the catcher tab 238 and the forward-catcher-fitting catch 172 within the catcher slot 240 is normally unloaded. Upon failure of the inboard forward fitting 122 or the outboard forward fitting 124, the interface between the catcher tab 238 and the forward-catcher-fitting catch 172 within the catcher slot 240 is loaded and provides an alternate failsafe load path. In one or more examples, a dimension of the catcher tab 238 is less than a dimension of the catcher slot 240.

As illustrated in FIG. 6, in one or more examples, the strut box 102 includes an aft strut-box clevis 144.

As illustrated in FIG. 6, in one or more examples, the aft fitting 142 includes an aft-fitting bracket 146, an aft-fitting clevis 154, the aft-fitting link 156, a first aft-fitting pin 158, and a second aft-fitting pin 160. The aft-fitting bracket 146 is coupleable to the aft spar 310 of the wing 304. The aft-fitting clevis 154 extends from the aft-fitting bracket 146. The aft-fitting link 156 is coupled to the aft-fitting clevis 154 by the first aft-fitting pin 158. The aft-fitting link 156 is coupled to the aft strut-box clevis 144 by the second aft-fitting pin 160. In these examples, the aft-fitting link 156 is a two-force member.

As illustrated in FIGS. 9 and 10, in one or more examples, the strut box 102 also includes a second aft strut-box clevis 194. The second aft strut-box clevis 194 is spaced away from aft strut-box clevis 144. In one or more examples, the aft strut-box clevis 144 is located proximate the inboard side 118 of the strut box 102 (e.g., a first strut-box clevis or inboard strut-box clevis) and the second aft strut-box clevis 194 is located proximate the outboard side 120 of the strut box 102 (e.g., an outboard strut-box clevis).

As illustrated in FIGS. 9 and 10, in one or more examples, the second aft fitting 186 includes a second aft-fitting bracket 206, a second aft-fitting clevis 208, the second aft-fitting link 210, a third aft-fitting pin 212, and a fourth aft-fitting pin 214. The second aft-fitting bracket 206 is coupleable to the aft spar 310 of the wing 304. The second aft-fitting clevis 208 extends from the second aft-fitting bracket 206. The second aft-fitting link 210 is coupled to the second aft-fitting clevis 208 by the third aft-fitting pin 212. The second aft-fitting link 210 is coupled to the second aft strut-box clevis 194 by the fourth aft-fitting pin 214. In these examples, the second aft-fitting link 210 is a two-force member.

In the illustrated examples of the system 100 described herein and shown in FIGS. 5-10, the pins of the various pin connections (e.g., double shear connections) have a particular orientation relative to the aircraft coordinate system (e.g., the X, Y, Z-coordinate system). As an example, the inboard-forward-fitting pin 134 and the outboard-forward-fitting pin 140 are oriented in the Y-direction (e.g., side-to-side) and the first central-forward-fitting pin 176, the second central-forward-fitting pin 178, the first aft-fitting pin 158, the second aft-fitting pin 160, the third aft-fitting pin 212, the fourth aft-fitting pin 214, and the catcher pin 234 are oriented in the X-direction (e.g., forward-to-aft). These example pin orientations may advantageously provide improved structural efficiency given the primary load directions, reduced misalignment, improved spatial distribution, and improved load distribution. However, in other non-illustrated examples, the pins of one or more of the pin connections may have a different orientation.

Figure 11:
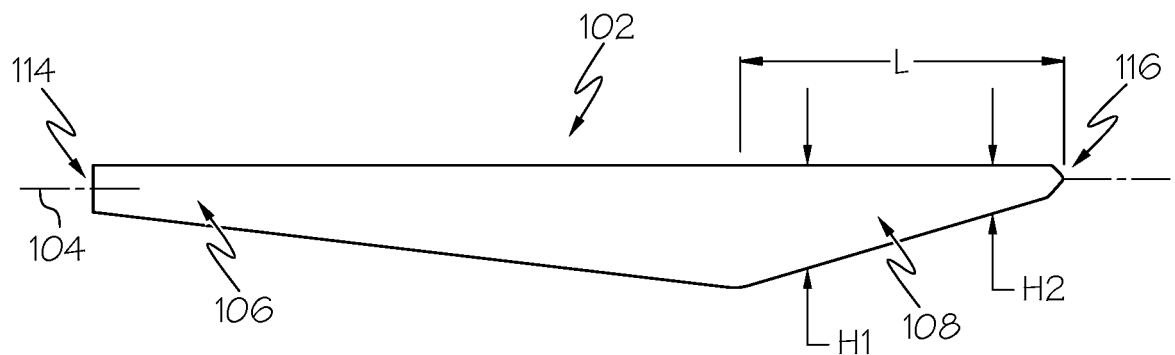
FIG. 11 is a schematic, side elevation view of an example of a strut box of the engine attachment system.
Figure 12:
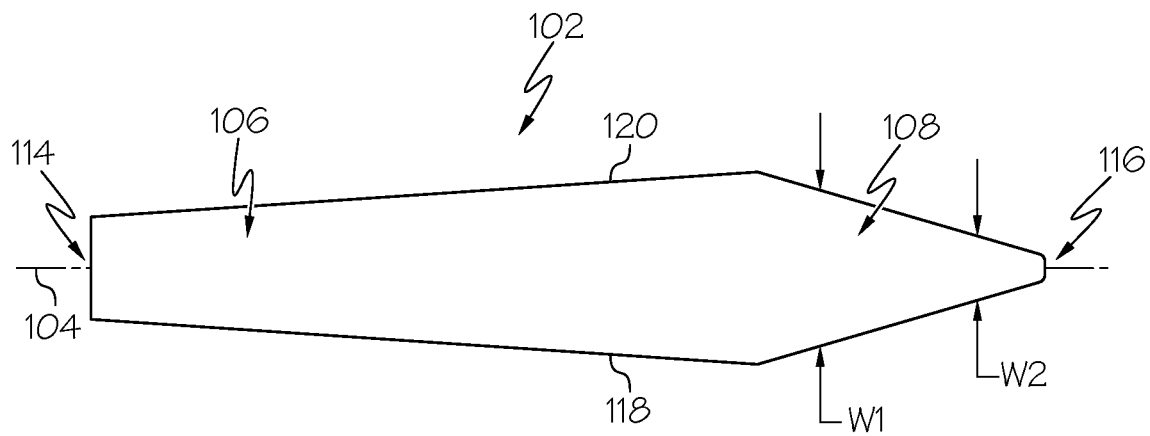
FIG. 12 is a schematic, top plan view of an example of the strut box of the engine attachment system.

FIGS. 11 and 12 schematically illustrate examples of the strut box 102. In one or more examples, a geometry and/or dimensions of the strut box 102 may be selected to adjust or control vertical bounce and/or lateral swing frequencies and to optimize the dynamic response of the strut box 102 in order to produce a desired vehicle level dynamic response.

As illustrated in FIG. 11, in one or more examples, the aft portion 108 of the strut box 102 has an aft-portion length L. The aft-portion length L is selected for a predetermined vibrational frequency of the strut box 102. As an example, the aft-portion length L of the aft portion 108 of the strut box 102 may be selected to adjust the lateral swing frequency and/or the vertical bounce frequency of the strut box 102.

As illustrated in FIG. 12, in one or more examples, the aft portion 108 of the strut box 102 has an aft-portion width W. The aft-portion width W is selected for a predetermined vibrational frequency of the strut box 102. As an example, the aft-portion width W of the aft portion 108 of the strut box 102 may be selected to adjust the lateral swing frequency and/or the vertical bounce frequency of the strut box 102. In one or more examples, the aft-portion width W of the aft portion 108 of the strut box 102 varies along the longitudinal axis 104 of the strut box 102. As an example, the aft-portion width W decreases along the longitudinal axis 104 from the forward portion 106 to the aft end 116 of the strut box 102. As an example, the aft portion 108 of the strut box 102 has at least a first aft-portion width W1 and a second aft-portion width W2. The first aft-portion width W1 and the second aft-portion width W2 are selected for a predetermined vibrational frequency of the strut box 102. In one or more examples, the first aft-portion width W1 and the second aft-portion width W2 are different, for example, the first aft-portion width W1 is greater than the second aft-portion width W2 However, in other examples, the width of the aft portion 108 may vary in other ways or may be constant.

As illustrated in FIG. 11, in one or more examples, in one or more examples, the aft portion 108 of the strut box 102 has an aft-portion height H. The aft-portion height H is selected for a predetermined vibrational frequency of the strut box 102. As an example, the aft-portion height H of the aft portion 108 of the strut box 102 may be selected to adjust the lateral swing frequency and/or the vertical bounce frequency of the strut box 102. In one or more examples, the aft-portion height H of the aft portion 108 of the strut box 102 varies along the longitudinal axis 104 of the strut box 102. As an example, the aft-portion height H decreases along the longitudinal axis 104 from the forward portion 106 to the aft end 116 of the strut box 102. As an example, the aft portion 108 of the strut box 102 has a first aft-portion height H1 and a second aft-portion height H2. The first aft-portion height H1 and the second aft-portion height H2 are selected for a predetermined vibrational frequency of the strut box 102. In one or more examples, the first aft-portion height H1 and the second aft-portion height H2 are different, for example, the first aft-portion height H1 is greater than the second aft-portion height H2. However, in other examples, the height of the aft portion 108 may vary in other ways or may be constant.

Figure 13:
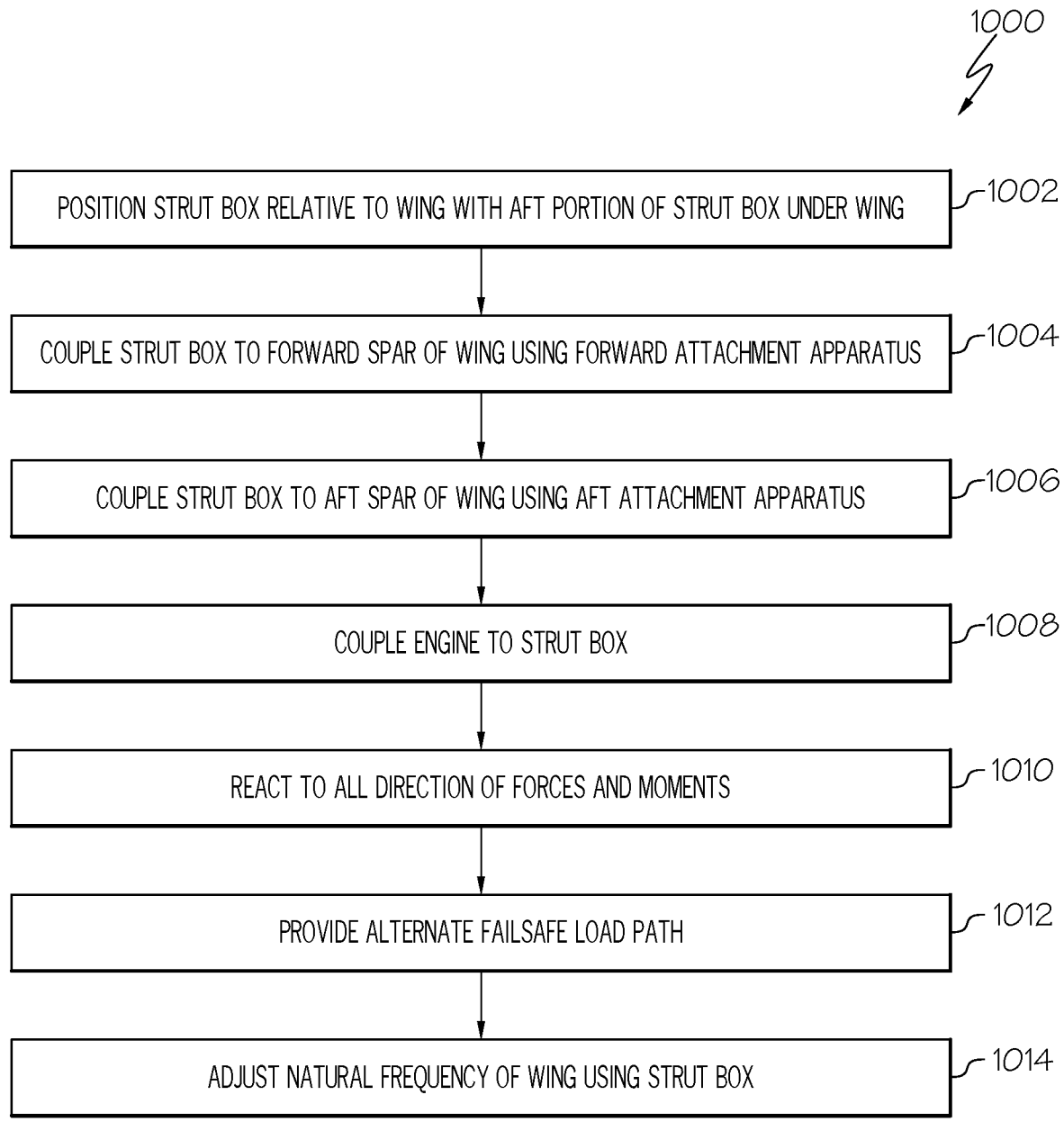
FIG. 13 is a flow diagram of an example of a method for attaching an engine to a wing of an aircraft.

Referring generally to FIGS. 1-12 and particularly to FIG. 13, by way of examples, the present disclosure is also directed to a method 1000 for attaching the engine 306 to the wing 304 of the aircraft 300. Example implementations of the method 1000 utilize the disclosed engine attachment system 100 (e.g., as shown in FIGS. 3-12).

Referring to FIG. 13, in one or more examples, the method 1000 includes a step of (block 1002) positioning the strut box 102 relative to the wing 304 such that the aft portion 108 of the strut box 102 is positioned under the wing 304. The forward portion 106 of the strut box 102 extends forward of the wing 304 (e.g., as shown in FIGS. 3 and 4).

The method 1000 includes a step of (block 1004) coupling the strut box 102 to the forward spar 308 of the wing 304 using the forward attachment apparatus 110. As an example, the forward portion 106 of the strut box 102 is coupled to the forward spar 308 of the wing 304 using the forward attachment apparatus 110 (e.g., as shown in FIGS. 3 and 4).

The method 1000 includes a step of (block 1006) coupling the strut box 102 to the aft spar 310 of the wing 304 using the aft attachment apparatus 112 such that the aft portion 108 of the strut box 102 remains positioned under the wing 304. As an example, the aft portion 108 of the strut box 102 is coupled to the aft spar 310 of the wing 304 using the aft attachment apparatus 112 (e.g., as shown in FIGS. 3 and 4)

The method 1000 includes a step of (block 1008) coupling the engine 306 to the strut box 102. As an example, the engine 306 is coupled to the forward portion 106 of the strut box 102. However, in another example, the engine 306 may be coupled to the forward portion 106 and the aft portion 108 of the strut box 102 (e.g., as shown in FIGS. 3 and 4).

The method 1000 includes a step of (block 1010) reacting to all directions of forces (e.g., X-directional forces, Y-directional forces, and Z-directional forces) and moments (e.g., X-directional moments, Y-directional moments, and Z-directional moments) applied to the strut box 102 using the forward attachment apparatus 110 and the aft attachment apparatus 112. As an example, the forward attachment apparatus 110 and the aft attachment apparatus 112 cooperatively react to all directions of forces and moments applied to the strut box 102.

In one or more examples, the step of (block 1004) coupling the strut box 102 to the forward spar 308 of the wing 304 using the forward attachment apparatus 110 includes a step of coupling the forward portion 106 of the strut box 102 to the forward spar 308 of the wing 304 using the inboard forward fitting 122, the outboard forward fitting 124, and the central forward fitting 162 (e.g., as shown in FIGS. 3, 4, 5, 7, 8 and 10).

In one or more examples, the step of (block 1004) coupling the strut box 102 to the forward spar 308 of the wing 304 includes a step of coupling the inboard forward fitting 122 to the forward spar 308 of the wing 304 and a step of coupling the inboard forward fitting 122 to the forward portion 106 of the strut box 102 (e.g., proximate the inboard side 118 of the strut box 102) by the inboard forward pin connection 148 (e.g., as shown in FIGS. 5, 7, 8 and 10).

In one or more examples, the step of (block 1004) coupling the strut box 102 to the forward spar 308 of the wing 304 includes a step of coupling the outboard forward fitting 124 to the forward spar 308 of the wing 304 and a step of coupling the outboard forward fitting 124 to the forward portion 106 of the strut box 102 (e.g., proximate the outboard side 120) of the strut box 102 by the outboard forward pin connection 150 (e.g., as shown in FIGS. 5, 7, 8 and 10).

In one or more examples, the step of (block 1004) coupling the strut box 102 to the forward spar 308 of the wing 304 includes a step of coupling the central forward fitting 162 to the forward spar 308 of the wing 304 and a step of coupling the central forward fitting 162 to the forward portion 106 of the strut box 102 (e.g., between the inboard side 118 and the outboard side 120 of the strut box 102) by the central forward pin connection 164 (e.g., as shown in FIGS. 5, 7, 8 and 10).

In one or more examples, the step of (block 1006) coupling the strut box 102 to the aft spar 310 of the wing 304 using the aft attachment apparatus 112 includes a step of coupling the aft portion 108 of the strut box 102 to the aft spar 310 of the wing 304 using the aft fitting 142 (e.g., as shown in FIG. 6).

In one or more examples, the step of (block 1006) coupling the strut box 102 to the aft spar 310 of the wing 304 includes a step of coupling the aft fitting 142 to the aft spar 310 of the wing 304 and a step of coupling the aft fitting 142 to the aft end 116 of the strut box 102 by the aft pin connection 152 (e.g., as shown in FIG. 6).

Referring generally to FIG. 13 and particularly to FIGS. 5 and 6, in one or more examples, the method 1000 utilizes example combinations of the forward attachment apparatus 110 as illustrated in FIG. 5 and the aft attachment apparatus 112 as illustrated in FIG. 6. Examples of reacting to all directions of forces and moments applied to the strut box 102 (block 1010) according to implementations of the method 1000 utilizing example combinations of the forward attachment apparatus 110 as illustrated in FIG. 5 and the aft attachment apparatus 112 as illustrated in FIG. 6 are provides below.

In one or more examples, reacting to all directions of forces and moments applied to the strut box 102 (block 1010) includes reacting to the X-directional force applied to the strut box 102 using the inboard forward fitting 122 and the outboard forward fitting 124.

In one or more examples, reacting to all directions of forces and moments applied to the strut box 102 (block 1010) includes reacting to the Y-directional force applied to the strut box 102 using central forward fitting 162.

In one or more examples, reacting to all directions of forces and moments applied to the strut box 102 (block 1010) includes reacting to the Z-directional force applied to the strut box 102 using the inboard forward fitting 122, the outboard forward fitting 124, and the aft fitting 142.

In one or more examples, reacting to all directions of forces and moments applied to the strut box 102 (block 1010) includes reacting to react to the X-directional moment applied to the strut box 102 using the inboard forward fitting 122 and the outboard forward fitting 124

In one or more examples, reacting to all directions of forces and moments applied to the strut box 102 (block 1010) includes reacting to the Y-directional moment applied to the strut box 102 using the inboard forward fitting 122, the outboard forward fitting 124, and the aft fitting 142.

In one or more examples, reacting to all directions of forces and moments applied to the strut box 102 (block 1010) includes reacting to react to the Z-directional moment applied to the strut box 102 using the inboard forward fitting 122 and the outboard forward fitting 124.

Referring to FIG. 13, in one or more examples, the step of (block 1006) coupling the strut box 102 to the aft spar 310 of the wing 304 using the aft attachment apparatus 112 includes a step of coupling the aft portion 108 of the strut box 102 to the aft spar 310 of the wing 304 using the aft fitting 142 and the second aft fitting 186 (e.g., as shown in FIGS. 9 and 10).

In one or more examples, the step of (block 1006) coupling the strut box 102 to the aft spar 310 of the wing 304 using the aft attachment apparatus 112 includes a step of coupling the aft fitting 142 to the aft end 116 of the strut box 102 (e.g., proximate the inboard side 118 of the strut box 102) by the aft pin connection 152, a step of coupling the second aft fitting 186 to the aft spar 310 of the wing 304, and a step of coupling the second aft fitting 186 to the aft end 116 of the strut box 102 (e.g., proximate the outboard side 120 of the strut box 102) by the second aft pin connection 190.

Referring generally to FIG. 13 and particularly to FIGS. 5 and 7-9, in one or more examples, the method 1000 utilizes example combinations of the forward attachment apparatus 110 as illustrated in FIG. 5 or 7 and 8 and the aft attachment apparatus 112 as illustrated in FIG. 9. Examples of reacting to all directions of forces and moments applied to the strut box 102 (block 1010) according to implementations of the method 1000 utilizing example combinations of the forward attachment apparatus 110 as illustrated in FIG. 5 or 7 and 8 and the aft attachment apparatus 112 as illustrated in FIG. 9 are provides below.

In one or more examples, reacting to all directions of forces and moments applied to the strut box 102 (block 1010) includes reacting to the X-directional force applied to the strut box 102 using the inboard forward fitting 122 and the outboard forward fitting 124.

In one or more examples, reacting to all directions of forces and moments applied to the strut box 102 (block 1010) includes reacting to the Y-directional force applied to the strut box 102 using the central forward fitting 162, the aft fitting 142, and the second aft fitting 186.

In one or more examples, reacting to all directions of forces and moments applied to the strut box 102 (block 1010) includes reacting to all directions of forces and moments applied to the strut box 102 (block 1010) includes reacting to the Z-directional force applied to the strut box 102 using the inboard forward fitting 122, the outboard forward fitting 124, the aft fitting 142, and the second aft fitting 186.

In one or more examples, reacting to all directions of forces and moments applied to the strut box 102 (block 1010) includes reacting to react to the X-directional moment applied to the strut box 102 using the inboard forward fitting 122, the outboard forward fitting 124, the aft fitting 142, and the second aft fitting 186.

In one or more examples, reacting to all directions of forces and moments applied to the strut box 102 (block 1010) reacting to the Y-directional moment applied to the strut box 102 using the inboard forward fitting 122, the outboard forward fitting 124, the aft fitting 142, and the second aft fitting 186.

In one or more examples, reacting to all directions of forces and moments applied to the strut box 102 (block 1010) includes reacting to the Z-directional moment applied to the strut box 102 using the inboard forward fitting 122 and the outboard forward fitting 124.

Referring to FIG. 13, in one or more examples, the method 1000 includes a step of (block 1012) providing an alternate failsafe load path upon a failure of one of forward attachment apparatus 110 and the aft attachment apparatus 112. As an example, at least one of the inboard forward fitting 122, the outboard forward fitting 124, the central forward fitting 162, the forward catcher fitting 226, the aft fitting 142, and the second aft fitting 186 provides an alternative failsafe load path upon failure of one of the inboard forward fitting 122, the outboard forward fitting 124, the central forward fitting 162, the aft fitting 142, and the second aft fitting 186.

In one or more examples, the step of (block 1004) coupling the strut box 102 to the forward spar 308 of the wing 304 includes a step of coupling the forward catcher fitting 226 to the forward spar 308 of the wing 304 (e.g., between the central forward fitting 162 and one of the inboard forward fitting 122 and the outboard forward fitting 124) and a step of coupling the forward catcher fitting 226 to the central forward fitting 162 and to the forward portion 106 of the strut box 102 by the forward catch connection 232 (e.g., as shown in FIGS. 7 and 8).

Referring generally to FIG. 13 and particularly to FIGS. 7-9, in one or more examples, the method 1000 utilizes example combinations of the forward attachment apparatus 110 as illustrated in FIGS. 7 and 8 and the aft attachment apparatus 112 as illustrated in FIG. 9. Examples of providing an alternate failsafe load path (block 1012) according to implementations of the method 1000 utilizing example combinations of the forward attachment apparatus 110 as illustrated in FIGS. 7 and 8 and the aft attachment apparatus 112 as illustrated in FIG. 9 are provides below.

In one or more examples, providing an alternate failsafe load path (block 1012) includes providing a failsafe load path to react to the Y-directional force applied to the strut box 102 upon a failure of the central forward fitting 162 using the inboard forward fitting 122 and the outboard forward fitting 124.

In one or more examples, providing an alternate failsafe load path (block 1012) includes providing a failsafe load path to react to the Y-directional force and the Z-directional force applied to the strut box 102 upon a failure of one of the aft fitting 142 and the second aft fitting 186 using another one of the aft fitting 142 and the second aft fitting 186.

In one or more examples, providing an alternate failsafe load path (block 1012) includes providing a redundant load path to react to the Y-directional moment and the Z-directional moment applied to the strut box 102 upon the failure of the one of the aft fitting 142 and the second aft fitting 186 using the inboard forward fitting 122, the outboard forward fitting 124, and the another one of the aft fitting 142 and the second aft fitting 186.

In one or more examples, providing an alternate failsafe load path (block 1012) includes providing a failsafe load path to react to the Z-directional force and the X-directional moment applied to the strut box 102 upon a failure of one of the inboard forward fitting 122 and the outboard forward fitting 124 using the forward catcher fitting 226.

In one or more examples, providing an alternate failsafe load path (block 1012) includes providing a redundant load path to react to the Y-directional moment applied to the strut box 102 upon the failure of the one of the inboard forward fitting 122 and the outboard forward fitting 124 using the aft fitting 142, the second aft fitting 186, and another one of the inboard forward fitting 122 and the outboard forward fitting 124.

In one or more examples, providing an alternate failsafe load path (block 1012) includes providing a redundant load path to react to the Z-directional moment applied to the strut box 102 upon the failure of the one of the inboard forward fitting 122 and the outboard forward fitting 124 using the another one of the inboard forward fitting 122 and the outboard forward fitting 124.

In one or more examples, the method 1000 includes a step of (block 1014) adjusting the modal or normal frequency of the wing 304 using the strut box 102. As an example, one or more dimensions of the strut box 102 is selected to adjust the modal or normal frequency of the wing 304 (e.g., as shown in FIGS. 11 and 12). As an example, one or more dimensions of the aft portion 108 of the strut box 102 may be selected to extend a moment couple distance between the engine 306 and the wing 304, increase the lateral stiffness of the wing 304, reduce wing-to-engine loads, adjust the vertical bounce frequency of the wing 304, and adjust the lateral swing frequency of the wing 304.

Accordingly, examples of the disclosed engine attachment system 100 and method 1000 decouple the dynamic characteristics between the wing 304 and the engine 306 such that the frequency for the wing 304 and the engine 306 do not line up. The present disclosure recognizes that when a wing and an engine have approximately the same natural frequency, dynamic loads may be increased. Traditionally, the wing and the engine run in a similar frequency range. The disclosed engine attachment system 100 and method 1000 utilize a unique layout configuration that is stiff and that drives the frequency higher to avoid flutter and gust. Additionally, the disclosed engine attachment system 100 and method 1000 enable the dimensions of the aft portion 108 of the strut box 102 to be adjusted to control or mitigate vertical bounce and lateral swing frequencies to up, or down, simultaneously, depending on vehicle stiffness. The disclosed engine attachment system 100 and method 1000 beneficial reduce the number of attachment interfaces and, for example, by eliminating conventional upper link attachments and diagonal braces between a strut box and the wing, facilitate installation of attachment fittings to a forward spar and aft spar of the wing, provide a reduction in spatial requirements, and provide an aerodynamic benefit.

Figure 14:
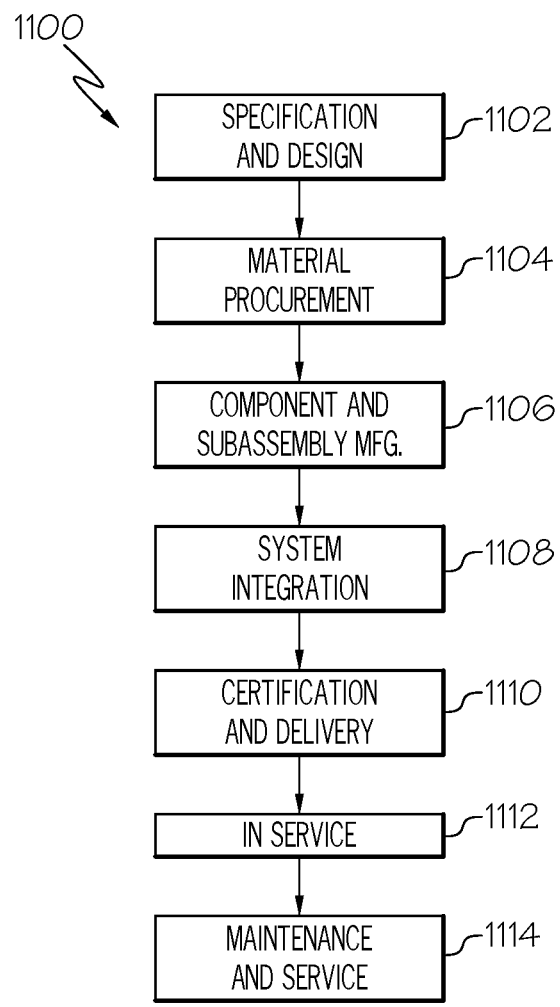
FIG. 14 is a flow diagram of an example aircraft service method.

Referring now to FIGS. 1, 2 and 14, examples of the engine attachment system 100 and the method 1000 may be related to, or used in the context of, an aircraft manufacturing and service method 1100, as shown in the flow diagram of FIG. 14 and the aircraft 300, as schematically illustrated in FIGS. 1 and 2. For example, the aircraft 300 and/or the aircraft production and service method 1100 may utilize the engine attachment system 100 and the method 1000 for attaching the engine 306 to the wing 304 of the aircraft 300.

Referring to FIG. 14, during pre-production, the method 1100 includes specification and design of the aircraft 300 (block 1102) and material procurement (block 1104). During production of the aircraft 300, component and subassembly manufacturing (block 1106) and system integration (block 1108) of the aircraft 300 take place. Thereafter, the aircraft 300 goes through certification and delivery (block 1110) to be placed in service (block 1112). Routine maintenance and service (block 1114) includes modification, reconfiguration, refurbishment, etc. of one or more systems of the aircraft 300.

Each of the processes of the method 1100 illustrated in FIG. 14 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the engine attachment system 100 and the method 1000 shown and described herein, may be employed during any one or more of the stages of the manufacturing and service method 1100 shown in the flow diagram illustrated by FIG. 14. In an example, attachment of the engine 306 to the wing 304 using the engine attachment system 100 or according to the method 1000 may form a portion of component and subassembly manufacturing (block 1106) and/or system integration (block 1108). Further, attachment of the engine 306 to the wing 304 using the engine attachment system 100 or according to the method 1000 may be utilized in a manner similar to components or subassemblies prepared while the aircraft 300 is in service (block 1112). Also, attachment of the engine 306 to the wing 304 using the engine attachment system 100 or according to the method 1000 may be utilized during system integration (block 1108) and certification and delivery (block 1110). Similarly, attachment of the engine 306 to the wing 304 using the engine attachment system 100 or according to the method 1000 may be utilized, for example and without limitation, while the aircraft 300 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

For the purpose of the present disclosure, the term "coupleable" refers to an item being capable of being coupled to another item before coupling the two items together or to an item being coupled to another item after coupling the two items together.

For the purpose of the present disclosure, the term "proximate" refers to the relative locations of two or more items being in close spatial relationship (e.g., at or near) each other.

For the purpose of the present disclosure, an item extending along an axis refers to an item being parallel to or coincident with the axis.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-12, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-12, referred to above, need be included in every example and not all elements, features, and/or components described herein are necessarily depicted in each illustrative example. Accordingly, some of the elements, features, and/or components described and illustrated in FIGS. 1-12 may be combined in various ways without the need to include other features described and illustrated in FIGS. 1-12, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-12, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-12, and such elements, features, and/or components may not be discussed in detail herein with reference to each of FIGS. 1-12. Similarly, all elements, features, and/or components may not be labeled in each of FIGS. 1-20 and 24, but reference numerals associated therewith may be utilized herein for consistency.

In FIGS. 13 and 14, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 13 and 14 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the engine attachment system 100, the aircraft 300, and the method 1000 have been shown and described, modifications may occur to those skilled in the art upon reading the specification. The present application includes such modifications and is limited only by the scope of the claims.

What is claimed is:

1. An engine attachment system for attaching an engine to a wing of an aircraft, the engine attachment system comprising:
   a strut box comprising a longitudinal axis, a forward portion extending along the longitudinal axis, and an aft portion extending from the forward portion along the longitudinal axis;
   a forward attachment apparatus comprising:
      an inboard forward fitting and an outboard forward fitting coupled to the forward portion of the strut box and coupleable to a forward spar of the wing;
      a central forward fitting coupleable to the forward spar of the wing;
      a central forward-fitting link coupled to the central forward fitting and to the forward portion of the strut box and comprising a catcher; and
      a forward catcher fitting coupleable to the forward spar of the wing and comprising a catcher opening that receives the catcher of the central forward-fitting link; and
   an aft attachment apparatus coupled to the aft portion of the strut box and coupleable to an aft spar of the wing, wherein:
      when the strut box is coupled to the wing by the forward attachment apparatus and the aft attachment apparatus, the aft portion of the strut box is positioned under the wing; and
      the strut box is coupleable to the engine.

2. The engine attachment system of claim 1, wherein, when the strut box is coupled to the wing by the forward attachment apparatus and the aft attachment apparatus, the aft portion of the strut box transverses a spanwise axis of the wing.

3. The engine attachment system of claim 1, wherein:
   the strut box further comprises:
      a forward end and an aft end opposite the forward end along the longitudinal axis; and
      an inboard side and an outboard side; and
   when the strut box is coupled to the wing by the forward attachment apparatus and the aft attachment apparatus, the aft end of the strut box is located proximate to the aft spar of the wing.

4. The engine attachment system of claim 3, wherein:
   the inboard forward fitting is coupleable to the forward spar of the wing and is coupled to the forward portion of the strut box at the inboard side of the strut box;
   the outboard forward fitting is coupleable to the forward spar of the wing and is coupled to the forward portion of the strut box at the outboard side of the strut box; and
   the central forward fitting is coupleable to the forward spar of the wing and is coupled to the forward portion of the strut box between the inboard side and the outboard side of the strut box.

5. The engine attachment system of claim 4, wherein:
   the inboard forward fitting is coupled to the forward portion of the strut box by an inboard forward pin connection;
   the outboard forward fitting is coupled to the forward portion of the strut box by an outboard forward pin connection;
   the central forward fitting is coupled to the forward portion of the strut box between the inboard side and the outboard side of the strut box by a central forward pin connection; and
   the aft fitting is coupled to the aft end of the strut box by an aft pin connection.

6. The engine attachment system of claim 5, wherein:
the inboard forward fitting and the outboard forward fitting are configured to react to an X-directional force applied to the strut box;
the central forward fitting is configured to react to a Y-directional force applied to the strut box;
the inboard forward fitting, the outboard forward fitting, and the aft fitting are configured to react to a Z-directional force applied to the strut box;
the inboard forward fitting and the outboard forward fitting are configured to react to an X-directional moment applied to the strut box;
the inboard forward fitting, the outboard forward fitting, and the aft fitting are configured to react to a Y-directional moment applied to the strut box; and
the inboard forward fitting and the outboard forward fitting are configured to react to a Z-directional moment applied to the strut box.

7. The engine attachment system of claim 5, wherein:
the inboard forward pin connection comprises an inboard double shear connection between the inboard forward fitting and the forward portion of the strut box;
the outboard forward pin connection comprises an outboard double shear connection between the outboard forward fitting and the forward portion of the strut box;
the central forward pin connection comprises:
a first central double shear connection between the central forward fitting and the central forward-fitting link; and
a second central double shear connection between the central forward-fitting link and the forward portion of the strut box; and
the aft pin connection comprises:
an aft-fitting link;
a first aft double shear connection between the aft fitting and the aft-fitting link; and
a second aft double shear connection between the aft-fitting link and the aft end of the strut box.

8. The engine attachment system of claim 7, wherein:
the aft fitting is coupled to the aft end of the strut box proximate the inboard side of the strut box; and
the aft attachment apparatus further comprises a second aft fitting that is coupleable to the aft spar of the wing and that is coupled to the aft end of the strut box proximate the outboard side of the strut box.

9. The engine attachment system of claim 8, wherein the second aft fitting is coupled to the aft end of the strut box by a second aft pin connection.

10. The engine attachment system of claim 9, wherein:
the inboard forward fitting and the outboard forward fitting are configured to react to an X-directional force applied to the strut box;
the central forward fitting, the aft fitting, and the second aft fitting are configured to react to a Y-directional force applied to the strut box;
the inboard forward fitting, the outboard forward fitting, the aft fitting, and the second aft fitting are configured to react to a Z-directional force applied to the strut box;
the inboard forward fitting, the outboard forward fitting, the aft fitting, and the second aft fitting are configured to react to an X-directional moment applied to the strut box;
the inboard forward fitting, the outboard forward fitting, the aft fitting, and the second aft fitting are configured to react to a Y-directional moment applied to the strut box; and
the inboard forward fitting and the outboard forward fitting are configured to react to a Z-directional moment applied to the strut box.

11. The engine attachment system of claim 10, wherein at least one of the inboard forward fitting, the outboard forward fitting, the central forward fitting, the catcher fitting, the aft fitting, and the second aft fitting provide an alternate failsafe load path upon a failure of another one of the inboard forward fitting, the outboard forward fitting, the central forward fitting, the aft fitting, and the second aft fitting.

12. The engine attachment system of claim 10, wherein:
one of the aft fitting and the second aft fitting is configured to provide a failsafe load path to react to the Y-directional force and the Z-directional force to the strut box upon a failure of another one of the aft fitting and the second aft fitting; and
the inboard forward fitting, the outboard forward fitting, and the one of the aft fitting and the second aft fitting provide a redundant load path to react to the Y-directional moment and the Z-directional moment applied to the strut box upon the failure of the another one of the aft fitting and the second aft fitting.

13. The engine attachment system of claim 10, wherein:
the catcher fitting is configured to provide a failsafe load path to react to the Z-directional force and the X-directional moment applied to the strut box upon a failure of one of the inboard forward fitting and the outboard forward fitting;
the aft fitting, the second aft fitting, and another one of the inboard forward fitting and the outboard forward fitting provide a redundant load path to react to the Y-directional moment applied to the strut box upon the failure of the one of the inboard forward fitting and the outboard forward fitting; and
the another one of the inboard forward fitting and the outboard forward fitting provides a redundant load path to react to the Z-directional moment applied to the strut box upon the failure of the one of the inboard forward fitting and the outboard forward fitting.

14. The engine attachment system of claim 9, wherein the second aft pin connection comprises:
a second aft-fitting link;
a third aft double shear connection between the second aft fitting and the second aft-fitting link; and
a fourth aft double shear connection between the second aft-fitting link and the aft end of the strut box.

15. The engine attachment system of claim 1, wherein:
the aft portion of the strut box has an aft-portion length; and
the aft-portion length is selected for a predetermined vibrational frequency of the strut box.

16. The engine attachment system of claim 1, wherein:
the aft portion of the strut box has a first aft-portion width and a second aft-portion width;
the first aft-portion width and the second aft-portion width are different; and
the first aft-portion width and the second aft-portion width are selected for a predetermined vibrational frequency of the strut box.

17. The engine attachment system of claim 1, wherein:
the aft portion of the strut box has a first aft-portion height and a second aft-portion height;
the first aft-portion height and the second aft-portion height are different; and
the first aft-portion height and the second aft-portion height are selected for a predetermined vibrational frequency of the strut box.

18. An aircraft comprising:
a fuselage;
a wing coupled to and extending from the fuselage, wherein the wing comprises a midline spanwise axis, a forward spar forward of the midline spanwise axis, and an aft spar rearward of the midline spanwise axis;
a strut box comprising a longitudinal axis, a forward portion extending along the longitudinal axis, and an aft portion extending from the forward portion along the longitudinal axis, positioned under the wing, and transversing the midline spanwise axis of the wing;
a forward attachment apparatus coupled to the forward portion of the strut box and coupled to the forward spar of the wing; and
an aft attachment apparatus coupled to the aft portion of the strut box and coupled to the aft spar of the wing; and
an engine coupled to the strut box.

19. A method for attaching an engine to a wing of an aircraft, the method comprising steps of:
positioning a strut box relative to the wing such that an aft portion of the strut box is positioned under the wing and transverses a midline spanwise axis of the wing;
coupling the strut box to a forward spar of the wing using a forward attachment apparatus at a position forward of the midline spanwise axis;
coupling the strut box to an aft spar of the wing using an aft attachment apparatus at a position rearward of the midline spanwise axis; and
coupling the engine to the strut box.

20. The aircraft of claim 18, wherein the forward attachment apparatus comprises:
an inboard forward fitting coupled to the forward portion of the strut box and to the forward spar of the wing;
an outboard forward fitting coupled to the forward portion of the strut box and to the forward spar of the wing;
a central forward fitting coupled to the forward spar of the wing;
a central forward-fitting link coupled to the central forward fitting and to the forward portion of the strut box and comprising a catcher; and
a forward catcher fitting coupled to the forward spar of the wing and comprising a catcher opening that receives the catcher of the central forward-fitting link.

* * * * *